(12) United States Patent
Shore et al.

(10) Patent No.: US 8,983,853 B2
(45) Date of Patent: *Mar. 17, 2015

(54) DISTRIBUTING ALTERNATIVELY GENERATED POWER TO A REAL ESTATE DEVELOPMENT

(75) Inventors: Michael Wayne Shore, Dallas, TX (US); Stuart Douglas Dwork, Dallas, TX (US)

(73) Assignee: Michael W. Shore, Dallas, TX (US)

( * ) Notice: Subject to any disclaimer, the term of this patent is extended or adjusted under 35 U.S.C. 154(b) by 11 days.

This patent is subject to a terminal disclaimer.

(21) Appl. No.: 12/402,982

(22) Filed: Mar. 12, 2009

(65) Prior Publication Data

US 2010/0010923 A1    Jan. 14, 2010

Related U.S. Application Data

(60) Provisional application No. 61/079,978, filed on Jul. 11, 2008.

(51) Int. Cl.
| | |
|---|---|
| *G06Q 50/00* | (2012.01) |
| *G01R 11/56* | (2006.01) |
| *G01R 21/133* | (2006.01) |
| *G06F 17/00* | (2006.01) |
| *G06Q 10/06* | (2012.01) |
| *G06Q 30/04* | (2012.01) |
| *G06Q 50/06* | (2012.01) |
| *G06Q 40/00* | (2012.01) |

(52) U.S. Cl.
CPC .............. *G06Q 10/06* (2013.01); *G06Q 30/04* (2013.01); *G06Q 50/06* (2013.01); *Y04S 50/12* (2013.01); *G06Q 40/12* (2013.12)
USPC ............................. 705/1.1; 705/313; 705/412

(58) Field of Classification Search
USPC .......................................... 705/313, 1.1, 412
See application file for complete search history.

(56) References Cited

U.S. PATENT DOCUMENTS

| | | |
|---|---|---|
| 6,512,966 B2 | 1/2003 | Lof et al. |
| 6,925,361 B1 | 8/2005 | Sinnock |
| 7,274,975 B2 | 9/2007 | Miller |

(Continued)

FOREIGN PATENT DOCUMENTS

WO    2014009954 A2    1/2014

OTHER PUBLICATIONS

Author Unknown, Wind Energy Information for Land Owners, Oregon Government web site http://www.oregon.gov/ENERGY/RENEW/Wind/windinfo.shtml.

(Continued)

*Primary Examiner* — Amanda Abrahamson
(74) *Attorney, Agent, or Firm* — Panitch Schwarze Belisar & Nadel LLP

(57) ABSTRACT

A system for distributing alternatively generated power to a real estate development includes at least one alternative energy electrical power generator forming a cooperative power farm. A power grid receives electrical power from the cooperative power farm. A metering credit system is configured to determine a metered credit of power received by the power grid from the cooperative power farm. A plurality of real estate properties are electrically coupled to the power grid and receive at least a portion of the metered credit of power. Ownership of at least one of the plurality of real estate properties includes rights to the portion of the metered credit.

24 Claims, 27 Drawing Sheets

(56) References Cited

U.S. PATENT DOCUMENTS

| | | | |
|---|---|---|---|
| 7,343,340 | B2 | 3/2008 | Jackson et al. |
| 7,391,126 | B2 | 6/2008 | Liu et al. |
| 7,406,364 | B2 | 7/2008 | Andren et al. |
| 7,809,621 | B2 | 10/2010 | Herzig |
| 7,890,436 | B2 | 2/2011 | Kremen |
| 8,019,445 | B2 | 9/2011 | Marhoefer |
| 2003/0144864 | A1 | 7/2003 | Mazzarella |
| 2004/0007879 | A1 | 1/2004 | Ruggieri et al. |
| 2007/0219932 | A1* | 9/2007 | Carroll et al. ............... 705/412 |
| 2008/0091625 | A1 | 4/2008 | Kremen |
| 2008/0167931 | A1 | 7/2008 | Gerstemeier et al. |
| 2008/0177558 | A1 | 7/2008 | Jung et al. |
| 2008/0183523 | A1* | 7/2008 | Dikeman ...................... 705/7 |
| 2008/0195563 | A1 | 8/2008 | James |
| 2008/0319895 | A1 | 12/2008 | Lazerson |
| 2009/0055300 | A1 | 2/2009 | McDowell |
| 2009/0157545 | A1 | 6/2009 | Mobley |
| 2009/0210269 | A1 | 8/2009 | Sade |
| 2009/0234757 | A1* | 9/2009 | Tarbell et al. ................ 705/30 |
| 2010/0287102 | A1 | 11/2010 | Sutton |
| 2010/0293045 | A1 | 11/2010 | Burns et al. |
| 2011/0172841 | A1 | 7/2011 | Forbes, Jr. |
| 2012/0023039 | A1 | 1/2012 | Kremen |
| 2012/0226592 | A1 | 9/2012 | Flynn |
| 2013/0006831 | A1 | 1/2013 | Mise et al. |
| 2013/0085921 | A1 | 4/2013 | Nguyen et al. |
| 2013/0173360 | A1 | 7/2013 | Thatcher |
| 2013/0226763 | A1 | 8/2013 | Kremen |

OTHER PUBLICATIONS

U.S. Appl. No. 12/402,996, Shore, Michael Wayne.
U.S. Appl. No. 12/403,003, Shore, Michael Wayne.
Oct. 6, 2010 Office Action cited in U.S. Appl. No. 12/402,996.
Oct. 6, 2010 Office Action cited in U.S. Appl. No. 12/403,003.
Pierre, Amanda; "CVPS Cow Power (TM) Expands to Vermont Electric Cooperative Farm Customer;" Dec. 6, 2006; Business Wire.
Dictionary "subdivide" 2007.
Rastler, Dan; "Chicago Area Homeowners to Test Residential Fuel Cells;" Business Wire; May 10, 2001; p. 1.
Trico; "Rules Regulations and Line Extension Policies;" http://www.trico.coop/rules_n_regs/RRLEP.htm#202; Aug. 17, 2005.
Office Action issued Oct. 7, 2011 in U.S. Appl. No. 12/403,003.
Examiner's Answer issued Dec. 20, 2011 in U.S. Appl. No. 12/402,996.
Office Action Issued Mar. 22, 2011 in U.S. Appl. No. 12/402,996.
Office Action Issued Apr. 7, 2011 in U.S. Appl. No. 12/403,003.
Parmley, Suzette. "on bucks brownfield, a green office center" Oct. 25, 2007 Knight Ridder Tribune Business News.
Office Action issued Dec. 21, 2012 in U.S. Appl. No. 12/403,003.
Adrian Andrews; "Solar Power Partners enables commercial building owners to access green energy;" www.mmdnewswire.com; printed on May 27, 2012; pp. 1-2.
Green Tbiz; "About Community Power, What Community Power is;" www.greentbiz.org; printed on Apr. 27, 2012; pp. 1-2.
Eco20-20; Financing Solar Energy Ownership: Solar Energy: Eco20/20; www.eco2020.com; printed on Apr. 27, 2012; pp. 1-4.
The Scottish Council for Voluntary Organisations; "Renewable Energy—the Benefits of ownership;" www.scvo.org.uk; printed on Apr. 27, 2012; pp. 1-2.
EcoGeek; "Qurrent Renewable Energy Sharing Ready for Prime Time;" www.ecogeek.org; printed on Apr. 27, 2012; pp. 1-3.
Ron van Erck; "Benefit Sharing Mechanisms in Renewable Energy;" www.reshare.nu; date: unknown; 13 pages.
Michigan Group; "Benefits to Implementing Renewable Energy Through Onsite Distributed Generation;" Michigan Green/Partners Green, www.michigangreen.org; date: unknown; 2 pages.
U.S. Appl. No. 13/495,466 by Shore, filed Jun. 13, 2012.
Office Action issued Apr. 25, 2014 in U.S. Appl. No. 13/495,466 by Shore.
Interview Summary dated May 29, 2014 in U.S. Appl. No. 13/495,466.
Alternative Energy and Alternate Uses of Existing Facilities on the Outer Continental Shelf. The Federal Register / FIND73. 132. (Jul 9, 2008).
Two Renewable Energy Initiatives Enter Circulation. US Fed News Service, Including US State News [Washington, D.C] Dec. 17, 2007.
Notice of Allowance issued Jul. 2, 2014 in U.S. Appl. No. 13/495,466.
Office Action issued Jul. 23, 2014 in U.S. Appl. No. 12/403,003.

* cited by examiner

US 8,983,853 B2

DISTRIBUTING ALTERNATIVELY GENERATED POWER TO A REAL ESTATE DEVELOPMENT

CROSS-REFERENCE TO RELATED APPLICATIONS

This application claims the benefit of U.S. Provisional Patent Application No. 61/079,978, filed on Jul. 11, 2008, entitled "Distributing Alternatively Generated Power to a Real Estate Development," the entire contents of which are incorporated by reference herein.

BACKGROUND OF THE INVENTION

Embodiments of the present invention are generally directed to the area of alternative energy distribution, ownership, billing, or the like, and more specifically, to distributing alternatively generated power to one or more real estate development projects or areas.

Currently, energy costs have been escalating. A residence that is at least partially self-sufficient is a benefit both economically and environmentally. Often, alternative energy installations include unsightly equipment, but to tie the source to the residence, the equipment must be incorporated into the residence or co-located on the residence lot or real estate parcel.

Additionally, when an alternative energy generator installation is located on a home, its efficiency may be reduced because of surrounding buildings, topography, or the direction in which the home faces. To make such an installation efficient, it might also be necessary to deforest the lot. If a single story home having solar panels installed is surrounded by two story homes or trees, shadowing may occur which would reduce efficiency, or the roof sides may not face the best direction to accumulate the solar energy. The structure may also have to be modified to handle the additional load of the panels.

Additionally, neighbors often complain or seek to block the installation of alternative energy generators for aesthetic reasons, noise generated by certain types of systems, or the fear that such systems pose a health or safety hazard in the event of malfunction.

Maintenance may prove to be problematic due to the fact that solar panels are typically installed on a roof, which is high off of the ground and may prove hazardous. Installations of alternative energy generators are also typically financially separate from the structure in terms of mortgage, so that any expense would normally handled on less favorable terms than a mortgage loan. The cost of energy for the average consumer is largely driven by carbon based fuels. These same fuels are in decline and if they follow the law of supply and demand, will increase in price as they decline in abundance, increasing the cost of residing in a home.

Currently, the cost for energy is at an inflation adjusted high and is expected to remain high for the foreseeable future. This increase in cost has been escalating, and a hedge against its continued increase has been sought after.

In concert with the sharp rise in the cost of electricity, the values of homes have fallen over the last few years. As such, homeowners are very sensitive to the cost of energy associated with a home. If a residential homeowner could effectively purchase energy once, as part of the purchase of the home, his ongoing costs would be reduced or eliminated, and the value of the property, which would become energy and income producing, or income neutral with respect to energy costs, would increase. This decrease in follow-on energy costs would make a property more valuable for new developments, existing neighborhoods, and offsite cooperative energy farms.

There are multiple ways to distribute alternatively generated power to a real estate development. During construction of a subdivision, a developer could set aside a percentage of the land to build an alternative energy installation and include, in the cost of the home, rights to a percentage of the generated power that are permanently tied to the real estate purchased. This would allow the homebuilder to tout the subdivision as being "green" and include an ongoing supply of free energy. Additionally, many state and federal laws do or will require power utilities to purchase excess energy produced by alternative energy installations. These requirements add to the economic value of a given property or properties that include as a permanent, transferable feature a percentage of energy production from an alternative energy installation. Any excess energy produced and sold could be either paid as dividends, applied to real estate taxes, common area maintenance or improvements, homeowners' association dues, or used for alternative energy system maintenance.

A grid tied system is proposed as one embodiment in which the cooperative energy farm feeds directly into an energy grid and energy credits are allotted to each real estate owner whose property is entitled to the credit. In this way energy used on other parts of the grid are offset by the energy farm and only the net usage is charged. This system also reduces the load on the existing electrical grid, which increases the buffer that the utilities need. The real estate property owner would be credited for new kilowatt hours input to the power grid.

The hurdles of separate and complex installation and maintenance, separate expense from a mortgage payment, aesthetic limitations, and inefficiencies in layout mitigate against individual installation of alternative energy generators.

Therefore, it is desirable to provide a method of combining the cooperative needs of homeowners to maximize the efficiency and concomitant economic benefit for distributing alternatively generated power to a real estate development, or stated another way, the association or linking of a cooperative energy farm to a specific residential property, such that a continuous renewable supply of electricity is sold with the property. More particularly, it is desirable to have a property that is at least partially self sufficient from an energy standpoint by virtue of the cooperative energy farm. This self-sufficiency would reduce the ongoing cost of owning the property and increase its net worth. This linkage of the real property and energy forms a hedge to mitigate the rising cost of energy and its effect on consumers, especially homeowners, and protects the homeowners from the depreciation of their real estate investment. The homeowner not only benefits from the normal appreciation tied to the ownership of the real estate, but also benefits from the rise in energy costs by making the value of the real estate increase because of the energy component.

SUMMARY OF THE INVENTION

A preferred embodiment of the present invention comprises a system for distributing alternatively generated power to a real estate development including at least one alternative energy electrical power generator forming a cooperative power farm. A power grid receives electrical power from the cooperative power farm. A metering credit system is configured to determine a metered credit of power received by the power grid from the cooperative power farm. A plurality of real estate properties are electrically coupled to the power grid and receive at least a portion of the metered credit of power. Ownership of at least one of the plurality of real estate properties includes rights to the portion of the metered credit.

Another preferred embodiment of the present invention comprises a system for distributing alternatively generated power to a real estate development including at least one alternative energy power generator forming a cooperative power farm. A distribution station receives power from the cooperative power farm. A metering credit system is configured to determine a metered credit of power received by the distribution station from the cooperative power farm. A plurality of real estate properties are coupled to the distribution station and receive at least a portion of the metered credit of power. Ownership of at least one of the plurality of real estate properties includes rights to the portion of the metered credit.

Still another embodiment of the present invention comprises a method for distributing alternatively generated power to a real estate development. The method includes generating alternative energy electrical power from a cooperative power farm. Electrical power is received from the cooperative power farm by a power grid. A credit of power received by the power grid from the cooperative power farm is metered. The credit of power is distributed to at least one of a plurality of real estate properties electrically coupled to the power grid. The plurality of real estate properties receive at least a portion of the credit of power. Ownership of the at least one of the plurality of real estate properties includes rights to the portion of the metered credit.

DETAILED DESCRIPTION OF THE INVENTION

Figure 1:
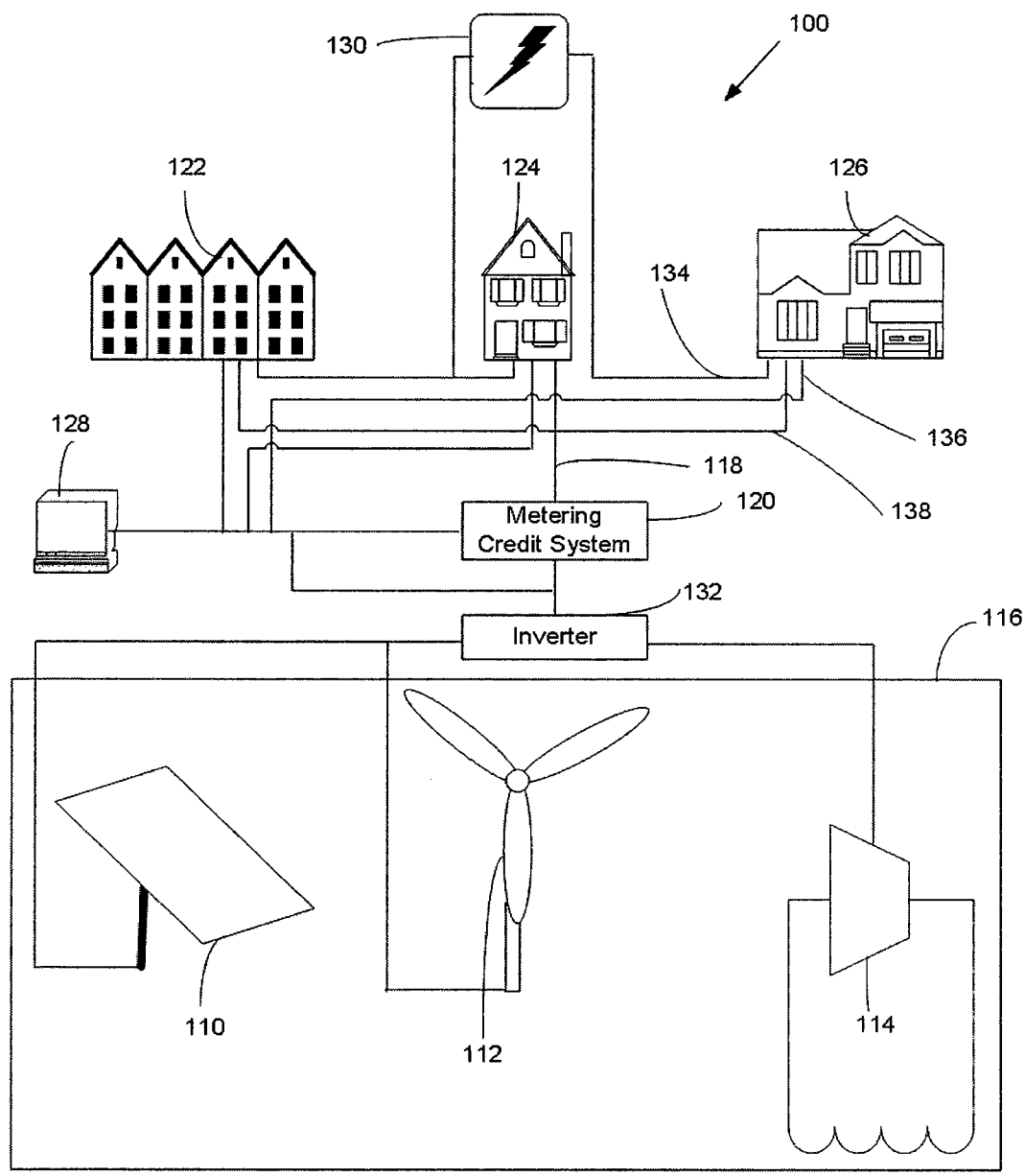
FIG. 1 is a schematic block diagram that illustrates a first preferred embodiment of a system for distributing alternatively generated power to a real estate development.

With respect to the description contained herein, it is to be realized that all equivalent relationships to those illustrated in the drawings and described in the specification are intended to be encompassed by the present application. Therefore, the description contained herein is considered as illustrative only of the principles of certain preferred embodiments. Further, since numerous modifications and changes will readily occur to those skilled in the art, it is not desired to limit any embodiment to the exact construction and operation shown and described, and accordingly, all suitable modifications and equivalents may be resorted to, falling within the scope of one of the embodiments. Additionally, the words "a" and "an", as used in the claims and in the corresponding portions of the specification, mean "at least one."

Referring now to FIG. 1, a first embodiment of a system 100 for distributing alternatively generated power to a real estate development is shown having at least one alternative energy electrical power generator 110, 112, 114, forming a cooperative power farm 116. A power grid 118 receives electrical power from the cooperative power farm 116. A metering credit system 120 determines a metered credit of power received by the power grid 118 from the cooperative power farm 116. A plurality of real estate properties 122, 124, 126 are electrically coupled to the power grid 118. Each of the real estate properties 122, 124, 126 receives at least a portion of the metered credit of power, and rights to the portion of the metered credit are linked to or included with ownership of at least one of the plurality of real estate properties 122, 124, 126. The power supplied by the cooperative power farm 116 may be supplied to a public utility grid, private power grid, or the like. The metering system 120 may be analog or digital in operation. The real estate properties 122, 124, 126 may encompass private residences, townhomes, apartments, duplexes, or the like, and may be either separate residences or agglomerated residences, such as in high-rises or the like. The ownership may be fee simple, condominium, co-operative in structure, or the like. The real estate may additionally encompass non-residential properties, such as businesses, manufacturing enterprises, or the like.

The electrical power generator 110, 112, 114 may comprise one or more power generator types, be it electrical, or other types of energy, such as natural gas or the like, and may, for example, include at least one solar powered generator 110 and/or at least one wind powered generator 112 and/or at least one geothermal powered generator 114 or the like. Other electrical power generators such as ocean wave electrical generators, hydroelectric generators, or the like are also included within the scope of this embodiment. The system 100 may include a power management system 128 monitoring the electrical power provided to at least one of the plurality of real estate properties 122, 124, 126. A portion of the electrical power is provided to at least one of the plurality of real estate properties 122, 124, 126 from a source 130 other than the cooperative power farm 116. The monitoring may be performed via wired or wireless communication, or may include Internet connectivity. The power farm 116 may also include an inverter 132. The at least one real estate property 122, 124, 126 may include a connection 134 to a public utility company 130, a connection 136 to the credit metering system 120, and a connection 138 to the grid 118. Additionally, the system 100 may include a power usage alert for updating a resident of the plurality of real estate properties 122, 124, 126 if a power usage spike is detected. The system 100 may also include a severe weather input coupled to the at least one electrical power generator for placing the generator in a stand-by state to reduce possible damage due to severe weather, and a solar panel having a resilient backing, wherein the resilient backing is turned toward the severe weather.

Figure 2:
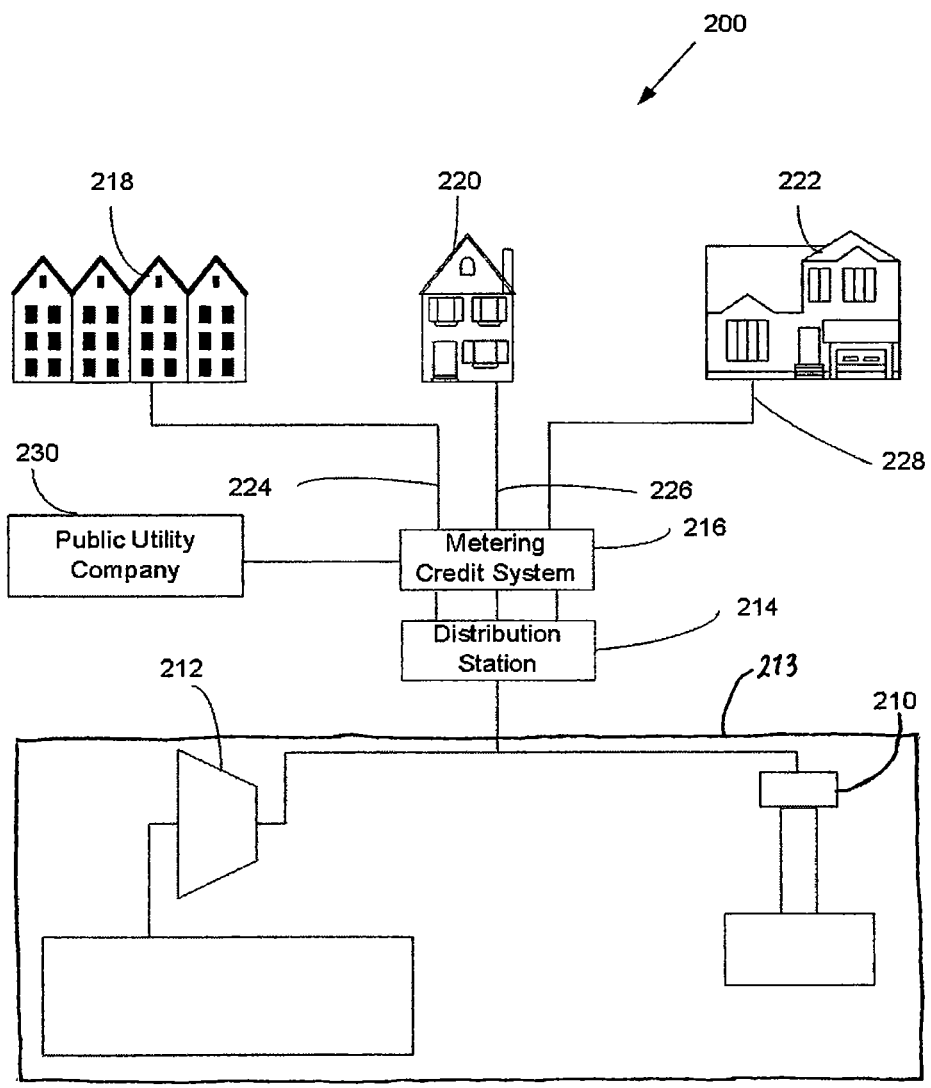
FIG. 2 is a schematic block diagram that illustrates a second preferred embodiment of a system for distributing alternatively generated power to a real estate development.

Referring now to FIG. 2, a second embodiment of a system 200 for distributing alternatively generated power to a real estate development is shown having at least one alternative energy power generator 210, 212 forming a cooperative power farm 213. A distribution station 214 receives power from the cooperative power farm, and a metering credit system 216 determines a metered credit of power received by the distribution station 214 from the cooperative power farm. A plurality of real estate properties 218, 220, 222 are coupled via power distribution lines 224, 226, 228 to the distribution station 214. The plurality of real estate properties 218, 220, 222 receives at least a portion of the metered credit of power. Rights to the portion of the metered credit are linked to or included with ownership of at least one of the plurality of real estate properties 218, 220, 222.

The power received from the cooperative power farm 213 may be in the form of a hydrogen bearing gas or a hydrocarbon gas, such as methane 212, natural gas 210, or the like, or power may be received in the form of electricity. The portion of the metered credit provides a quantity of power at least partially determined by one or more of a percentage of the power generated by the cooperative power farm 213, a number of units of metered credit or the like, an area of the real estate property or the like, and an initial payment. The rights to the portion of the metered credit may be optional.

Figure 3:
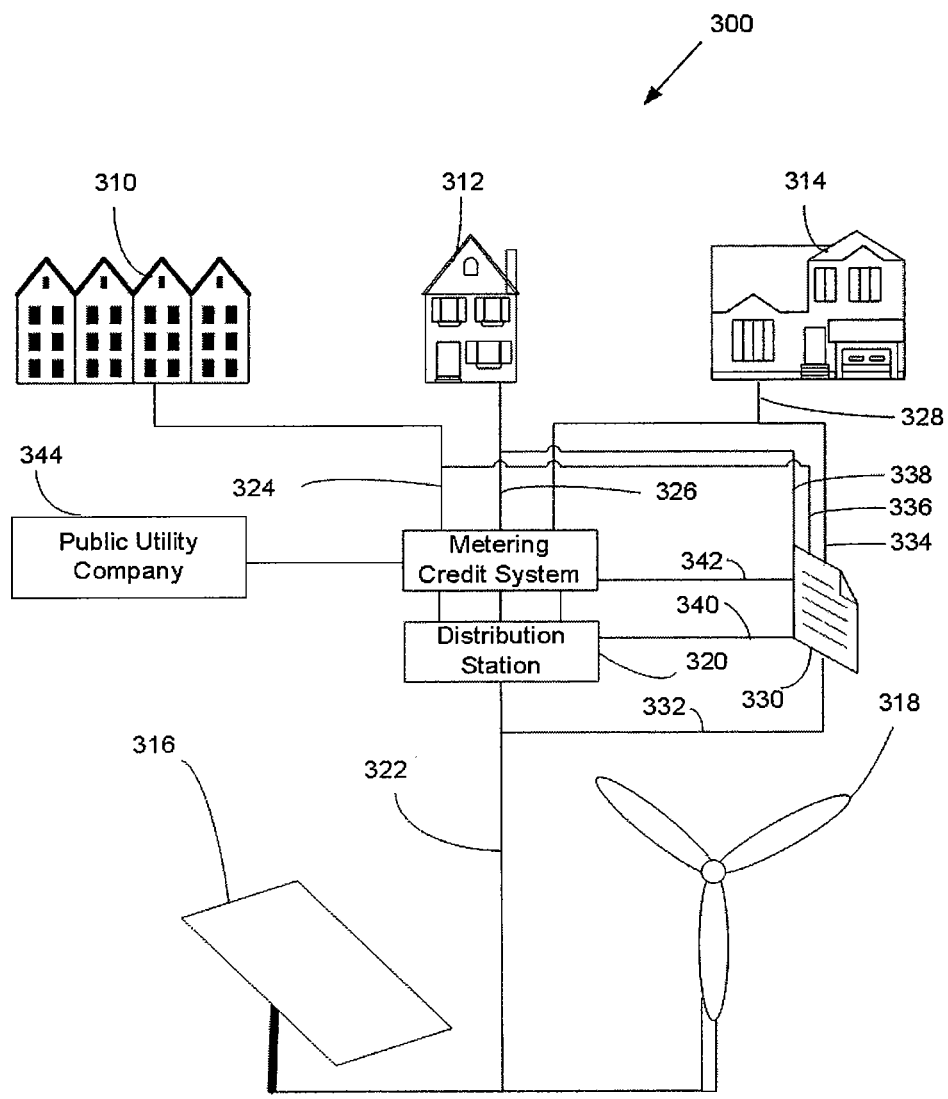
FIG. 3 is a schematic block diagram that illustrates a third preferred embodiment of a system for distributing alternatively generated power to a real estate development.

Referring now to FIG. 3, a third embodiment of a system 300 for distributing alternatively generated power to a real estate development is shown, wherein the real estate development has at least two individual properties 310, 312, 314. The system 300 includes at least one alternative energy power generator 316, 318, a distribution station 320 having a connection 322 to the at least one alternative energy power generator 316, 318, and a plurality of real estate properties 310, 312, 314 coupled via power distribution lines 324, 326, 328 to the distribution station 320. An instrument 330 associates ownership rights in a portion of the power received from the alternative energy power generator 316, 318 with ownership of at least one of the plurality of real estate properties 310, 312, 314. Ownership rights in the portion of the power may be inseparably tied to ownership of the real estate properties 310, 312, 314, severable from ownership of the real estate properties 310, 312, 314, or the like.

The portion of power described in the instrument 330 provides a quantity of power at least partially calculated or determined by a percentage of power generated by the at least one alternative energy power generator 316, 318, a number of power units of power generated by the at least one alternative energy power generator 316, 318, equal distribution of power generated by the at least one alternative energy power generator 316, 318 to each of the at least two individual properties 310, 312, 314, an area of each of the at least two individual properties 310, 312, 314, and an initial payment associated with at least one of the at least two individual properties 310, 312, 314. Additionally, the portion of the instrument 330 associating ownership rights of the portion of power with the ownership rights of the at least two individual properties 310, 312, 314 may be optional.

The system 300 may also include a written instrument granting ownership rights 332 in the at least one alternative energy power generator 316, 318, an instrument granting ownership rights 340 in the distribution station 320 and electrical power distribution lines 324, 326, 328, and an instrument granting ownership rights 334, 336, 338 in the electrical power distribution lines 324, 326, 328. As used herein, a written instrument can be a paper or electronic writing. Further, the instrument may optionally contain restrictions that prevent encumbrance of the energy portion without encumbrance of the real property portion, or may allow for the encumbrance as a separate right.

Figure 4:
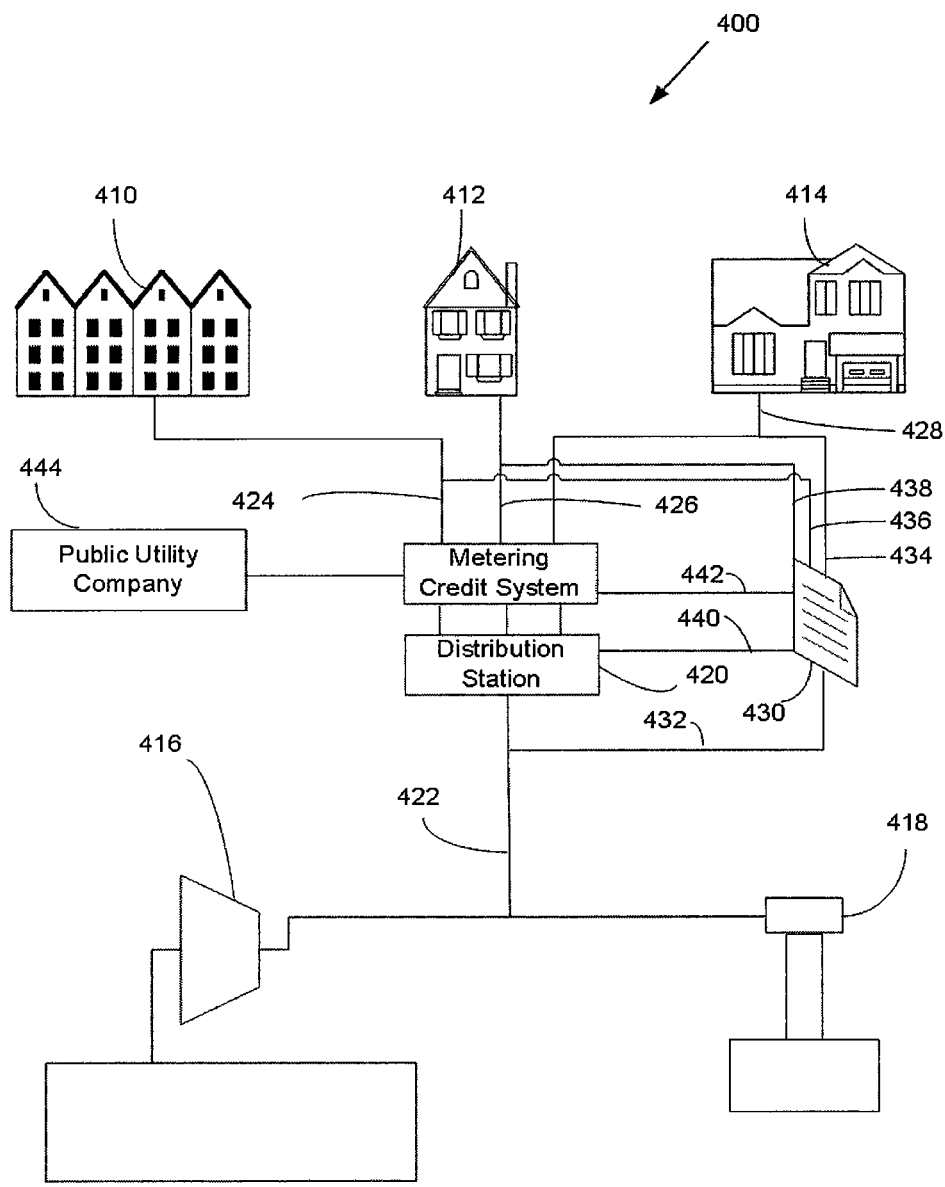
FIG. 4 is a schematic block diagram that illustrates a fourth preferred embodiment of a system for distributing alternatively generated power to a real estate development.

Referring now to FIG. 4, a fourth embodiment of a system 400 for distributing alternatively generated power to a real estate development is shown, wherein the real estate development has at least two individual properties 410, 412, 414. The system 400 includes at least one alternative energy power generator 416, 418, a distribution station 420 having a connection 422 to the at least one alternative energy power generator 416, 418, and a plurality of real estate properties 410, 412, 414 coupled via power distribution lines 424, 426, 428 to the distribution station 420. A written instrument 430 associates ownership rights in a portion 432 of the power received from the alternative energy power generator with ownership rights 434, 436, 438 of at least one of the plurality of real estate properties 410, 412, 414. The alternative energy power generator 416, 418 may be hydrogen bearing gas or hydrocarbon gas such as methane or natural gas.

FIGS. 5-23 are flow diagrams that illustrate the steps of preferred method embodiments of distributing alternatively generated power to a real estate development and include a number of blocks or modules that may be implemented in software, hardware, firmware, and/or the combination of software, hardware, and/or firmware.

Figure 5:
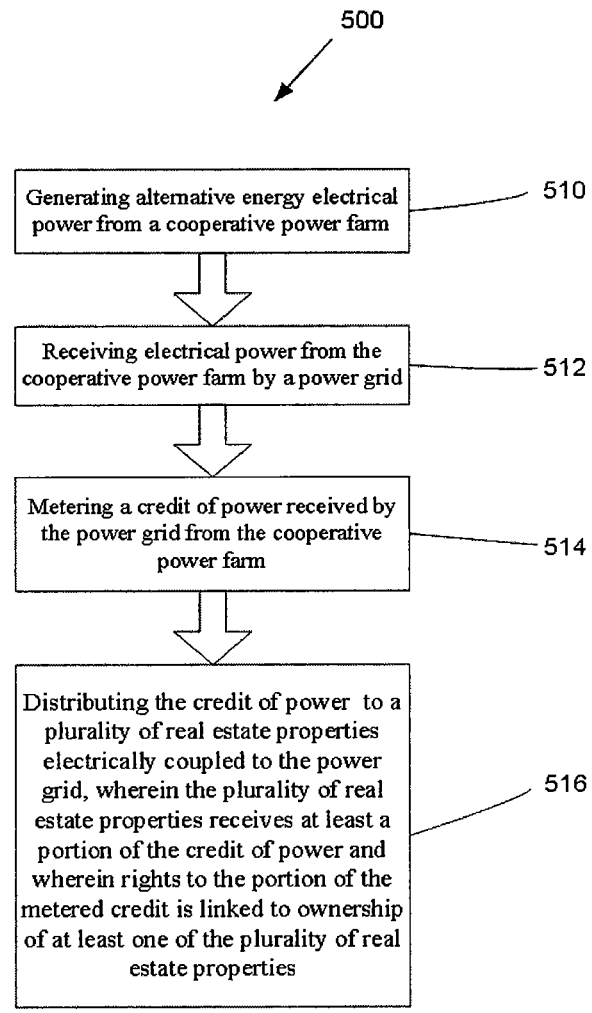
FIG. 5 is a flow diagram that illustrates a first method of an embodiment of distributing alternatively generated power to a real estate development.

Referring to FIG. 5, a first preferred embodiment of distributing alternatively generated power to a real estate development 500 is depicted and includes generating 510 alternative energy electrical power from a cooperative power farm and receiving 512 electrical power from the cooperative power farm by a power grid. A credit of power received by the power grid from the cooperative power farm is metered 514 and distributed 516 to at least one of a plurality of real estate properties electrically coupled to the power grid. The plurality of real estate properties receives at least a portion of the credit of power. Rights to the portion of the metered credit are linked or included with ownership of the at least one of the plurality of real estate properties.

Figure 6:
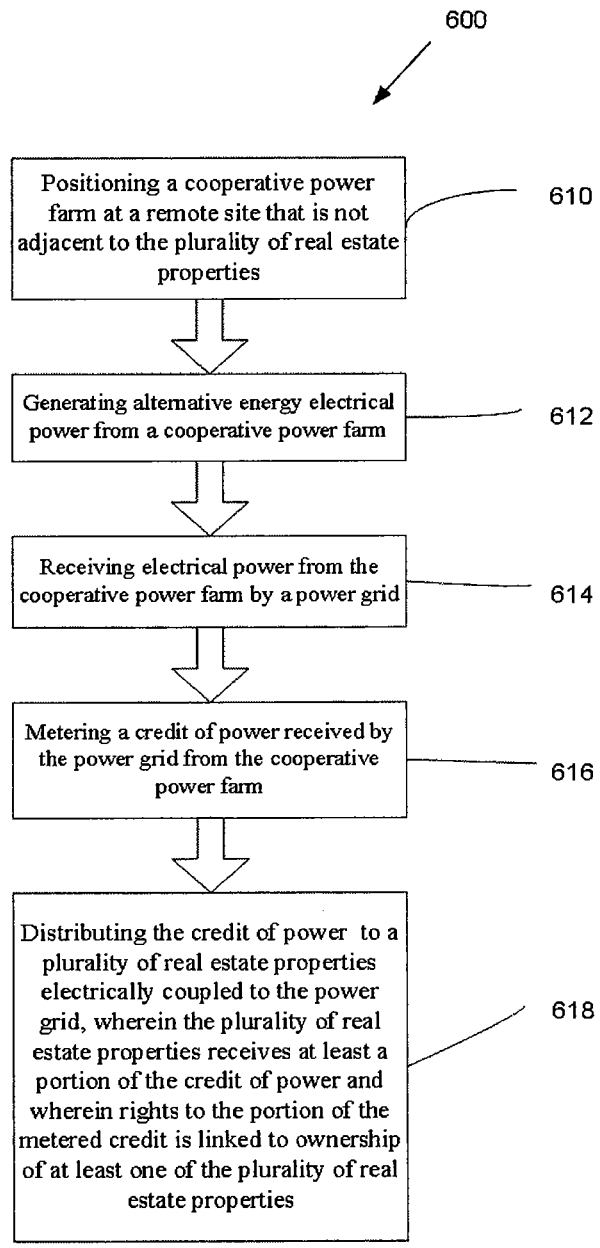
FIG. 6 is a flow diagram that illustrates a second method of an embodiment of distributing alternatively generated power to a real estate development.

FIG. 6 shows a second preferred embodiment of distributing alternatively generated power to a real estate development 600 that includes providing 610 a remote site and a plurality of real estate properties. The remote site is not adjacent to the plurality of real estate properties. Alternative energy electrical power is generated 612 from a cooperative power farm positioned at the remote site. Electrical power from the cooperative power farm is received 614 by a power grid. A credit of power received by the power grid from the cooperative power farm is metered 616 and distributed 618 to at least one of the plurality of real estate properties electrically coupled to the power grid. The plurality of real estate properties receives at least a portion of the credit of power. Rights to the portion of the metered credit are linked or included with ownership of the at least one of the plurality of real estate properties.

Figure 7:
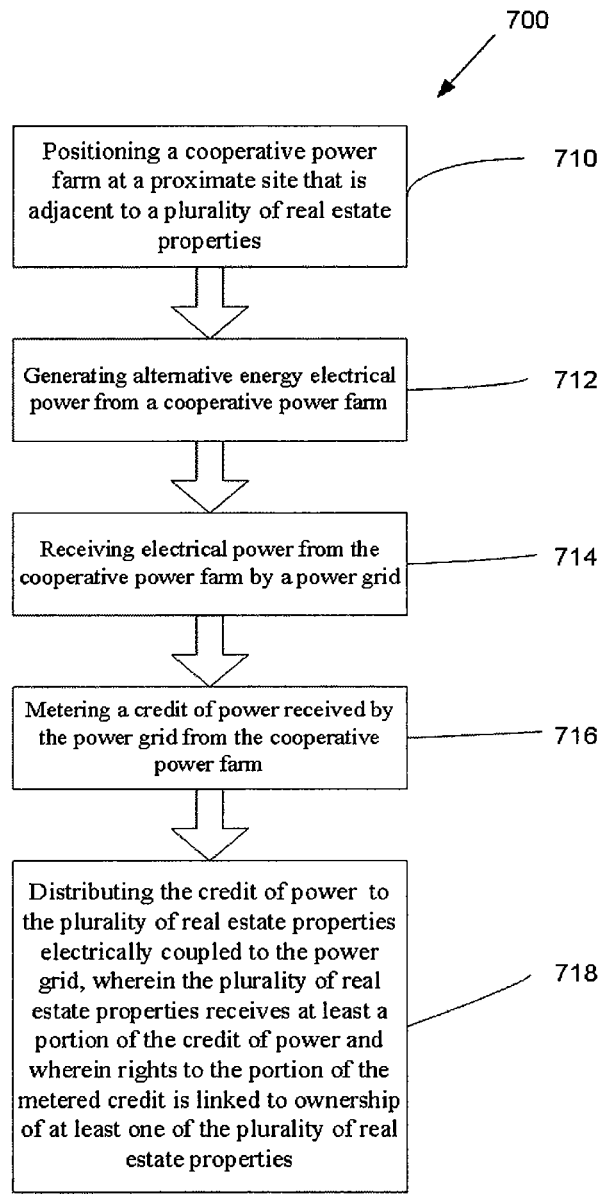
FIG. 7 is a flow diagram that illustrates a third method of an embodiment of distributing alternatively generated power to a real estate development.

FIG. 7 depicts a third preferred embodiment of distributing alternatively generated power to a real estate development 700 that includes providing 710 a proximate site and a plurality of real estate properties. The proximate site is adjacent to the plurality of real estate properties. Alternative energy electrical power is generated 712 from a cooperative power farm. Electrical power from the cooperative power farm is received 714 by a power grid. A credit of power received by the power grid from the cooperative power farm is metered 716 and distributed 718 to at least one of a plurality of real estate properties electrically coupled to the power grid. The plurality of real estate properties receives at least a portion of the credit of power. Rights to the portion of the metered credit are included with ownership of the at least one of the plurality of real estate properties.

Figure 8:
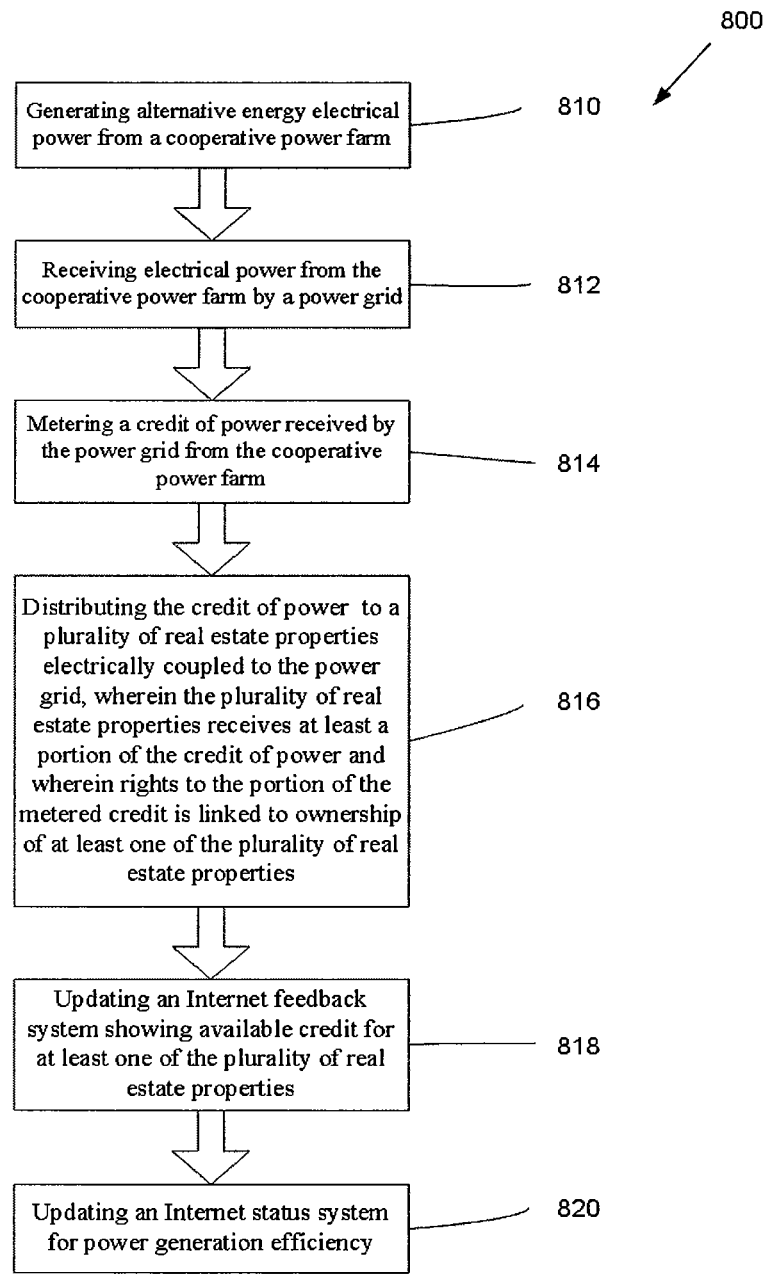
FIG. 8 is a flow diagram that illustrates a fourth method of an embodiment of distributing alternatively generated power to a real estate development.

Referring to FIG. 8, a fourth preferred embodiment of distributing alternatively generated power to a real estate development 800 is depicted and includes generating 810 alternative energy electrical power from a cooperative power farm. Electrical power from the cooperative power farm is received 812 by a power grid. A credit of power received by the power grid from the cooperative power farm is metered 814 and distributed 816 to at least one of a plurality of real estate properties electrically coupled to the power grid. The plurality of real estate properties receives at least a portion of the credit of power. Rights to the portion of the metered credit are included with ownership of the at least one of the plurality of real estate properties. An Internet feedback system is updated 818, showing available credit for at least one of the plurality of real estate properties. An Internet status system is also updated 820 for power generation efficiency.

Figure 9:
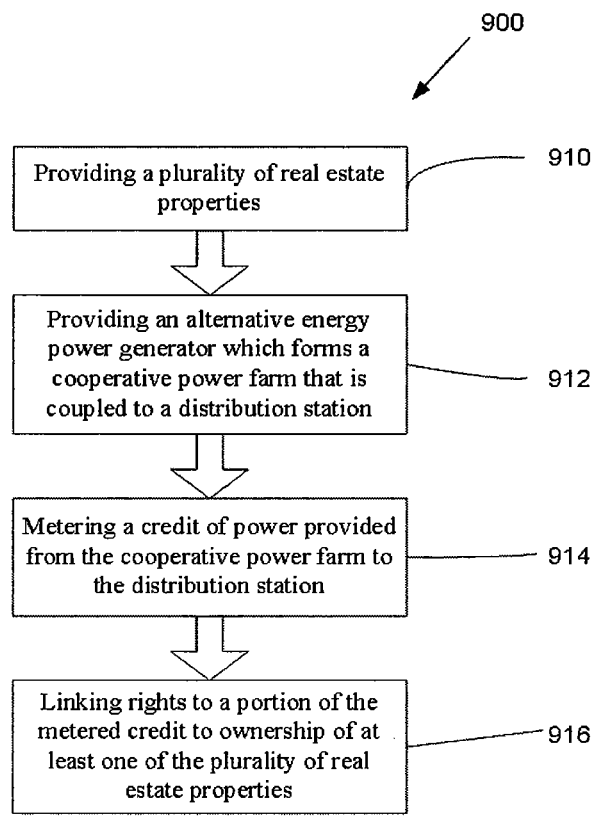
FIG. 9 is a flow diagram that illustrates a fifth method of an embodiment of distributing alternatively generated power to a real estate development.

FIG. 9 shows a fifth preferred embodiment of distributing alternatively generated power to a real estate development 900 that includes providing 910 a plurality of real estate properties, providing 912 an alternative energy power generator that forms a cooperative power farm coupled to a distribution station, and metering 914 a credit of power provided from the cooperative power farm to the distribution station. Rights to a portion of the metered credit are included 916 with ownership of at least one of the plurality of real estate properties.

Figure 10:
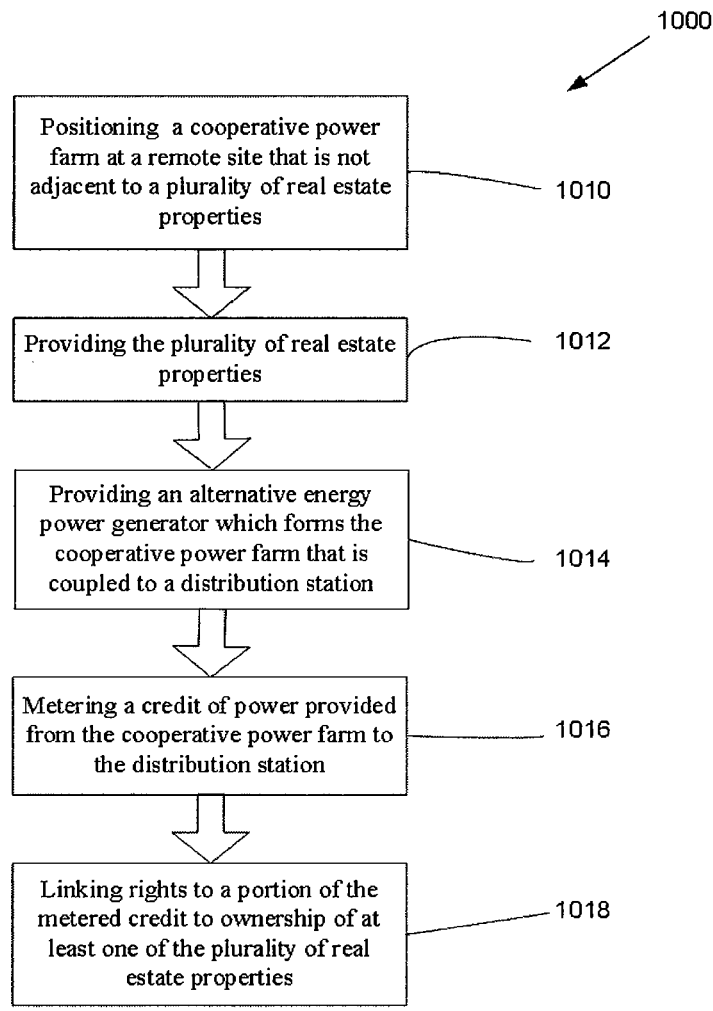
FIG. 10 is a flow diagram that illustrates a sixth method of an embodiment of distributing alternatively generated power to a real estate development.

FIG. 10 depicts a sixth preferred embodiment of distributing alternatively generated power to a real estate development 1000 that includes providing 1010 a remote site, providing 1012 a plurality of real estate properties, and providing 1014 an alternative energy power generator which forms a cooperative power farm that is coupled to a distribution station. The remote cooperative power farm is positioned on the remote site, which is not adjacent to the plurality of real estate properties. A credit of power provided from the cooperative power farm to the distribution station is metered 1016. Rights to a portion of the metered credit are included 1018 with ownership of at least one of the plurality of real estate properties.

Figure 11:
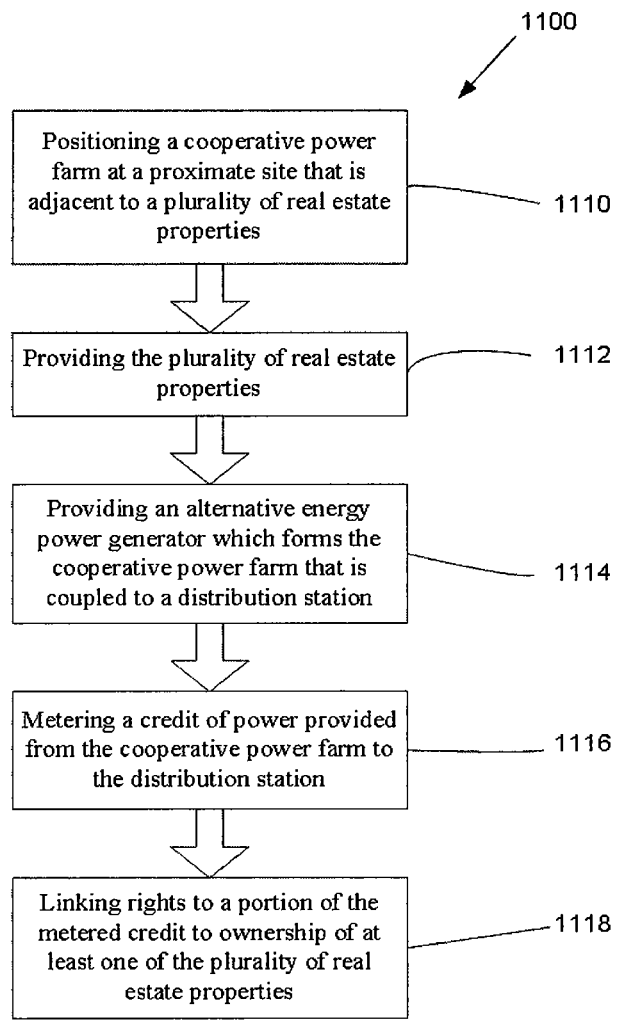
FIG. 11 is a flow diagram that illustrates a flow diagram of an embodiment of distributing alternatively generated power to a real estate development.

Referring to FIG. 11, a seventh preferred embodiment of distributing alternatively generated power to a real estate development 1100 is depicted and includes providing 1110 a proximate site, providing 1112 a plurality of real estate properties, and providing 1114 an alternative energy power generator which forms a cooperative power farm that is coupled to a distribution station. The cooperative power farm is positioned on the proximate site, which is adjacent to the plurality of real estate properties. A credit of power provided from the cooperative power farm to the distribution station is metered 1116. Rights to a portion of the metered credit are included 1118 with ownership of at least one of the plurality of real estate properties.

Figure 12:
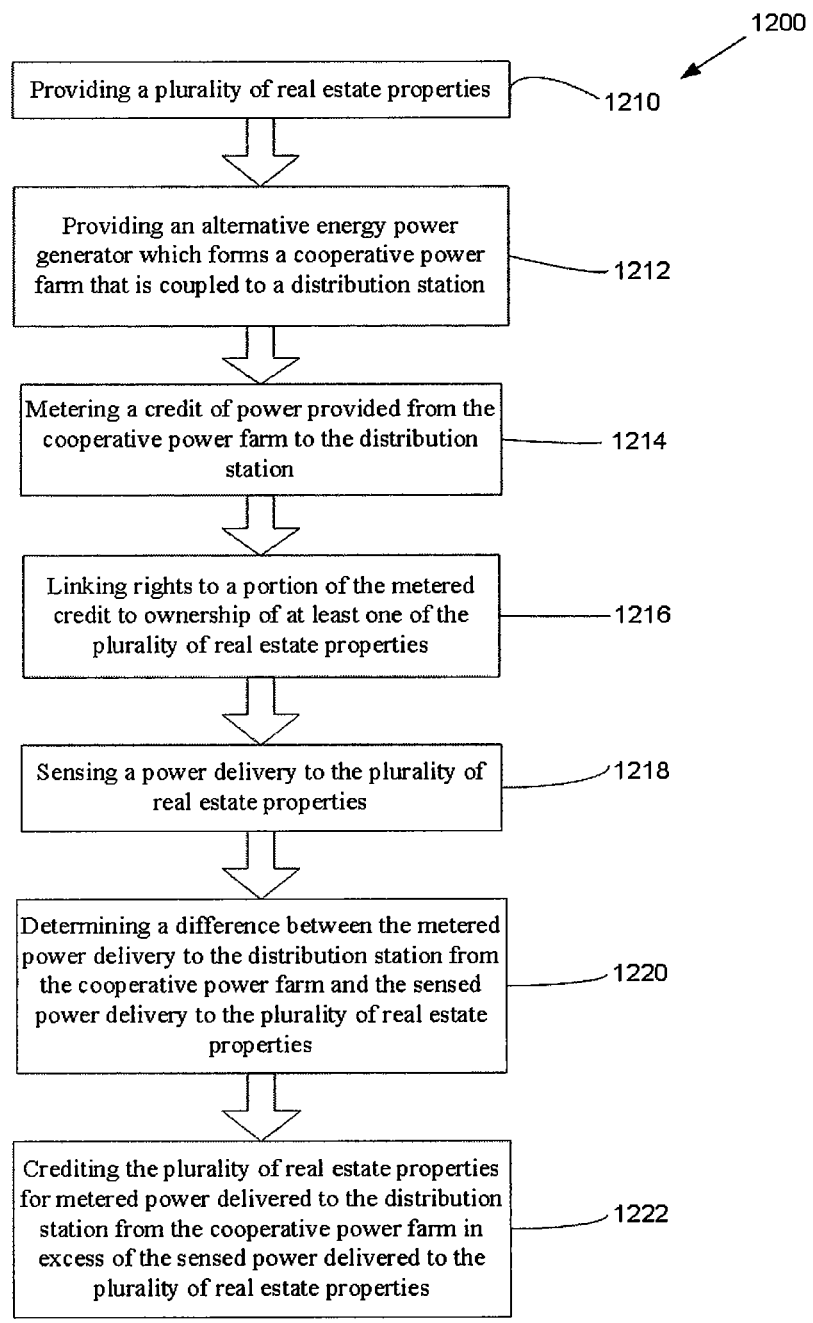
FIG. 12 is a flow diagram that illustrates an eighth method of an embodiment of distributing alternatively generated power to a real estate development.

FIG. 12 shows an eighth preferred embodiment of distributing alternatively generated power to a real estate development 1200 that includes providing 1210 a plurality of real estate properties, providing 1212 an alternative energy power generator which forms a cooperative power farm that is coupled to a distribution station, and metering 1214 a credit of power provided from the cooperative power farm to the distribution station. Rights to a portion of the metered credit are included 1216 with ownership of at least one of the plurality of real estate properties. A power delivery to at least one of the plurality of real estate properties is sensed 1218 and a difference between the metered power delivery to the distribution station from the cooperative power farm and the sensed power delivery to the at least one of the plurality of real estate properties is determined 1220. At least one of the plurality of real estate properties is credited 1222 for metered power delivered to the distribution station from the cooperative power farm in excess of the sensed power delivered to the at least one of the plurality of real estate properties.

Figure 13:
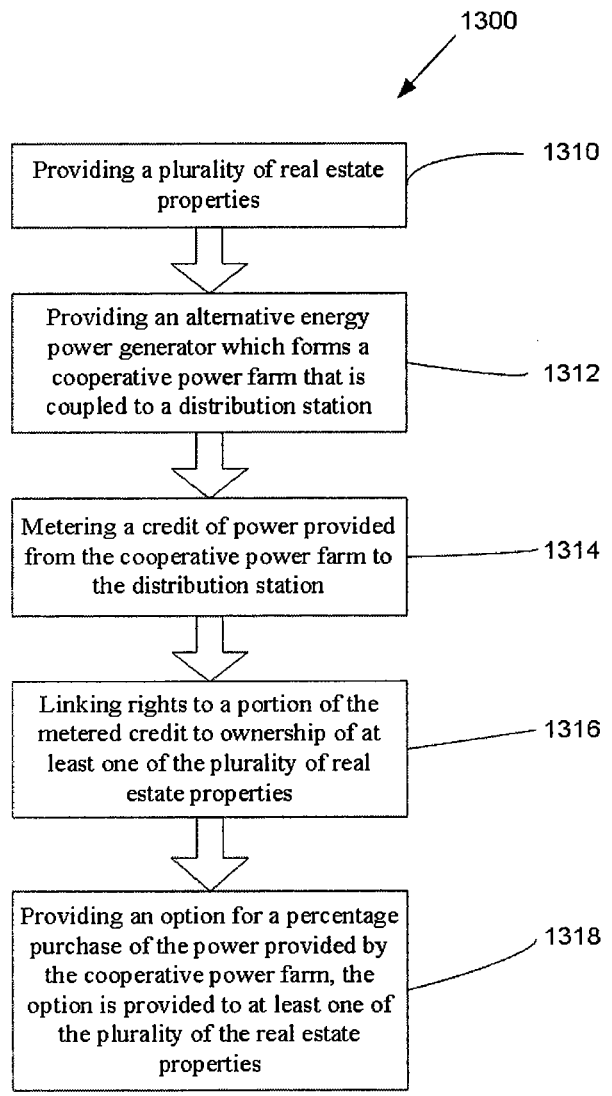
FIG. 13 is a flow diagram that illustrates a ninth method of an embodiment of distributing alternatively generated power to a real estate development.

FIG. 13 depicts a ninth preferred embodiment of distributing alternatively generated power to a real estate development 1300 that includes providing 1310 a plurality of real estate properties, providing 1312 an alternative energy power generator which forms a cooperative power farm that is coupled to a distribution station, and metering 1314 a credit of power provided from the cooperative power farm to the distribution station. Rights to a portion of the metered credit are included 1316 with ownership of at least one of the plurality of real estate properties. An option is provided 1318 to the at least one of the plurality of real estate properties for a percentage purchase of the power provided by the cooperative power farm.

Figure 14:
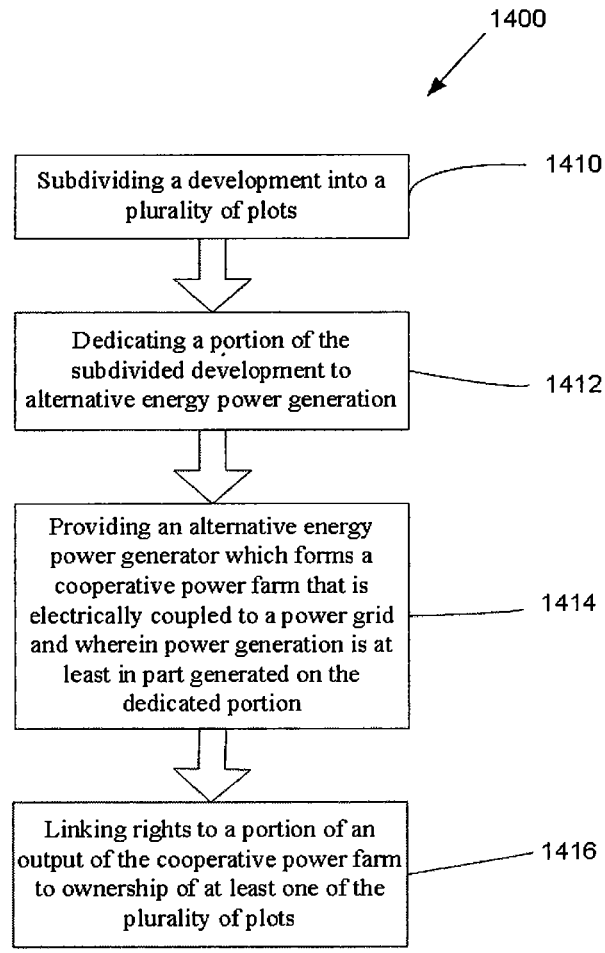
FIG. 14 is a flow diagram that illustrates a tenth method of an embodiment of distributing alternatively generated power to a real estate development.

Referring to FIG. 14, a tenth preferred embodiment of distributing alternatively generated power to a real estate development 1400 is depicted and includes subdividing 1410 the real estate development into a plurality of plots. A portion of the subdivided real estate development is dedicated 1412 to alternative energy power generation. An alternative energy power generator is provided 1414, which forms a cooperative power farm that is electrically coupled to a power grid. Power is at least in part generated on the dedicated portion. Rights to a portion of an output of the cooperative power farm are included 1416 with ownership of at least one of the plurality of plots.

Figure 15:
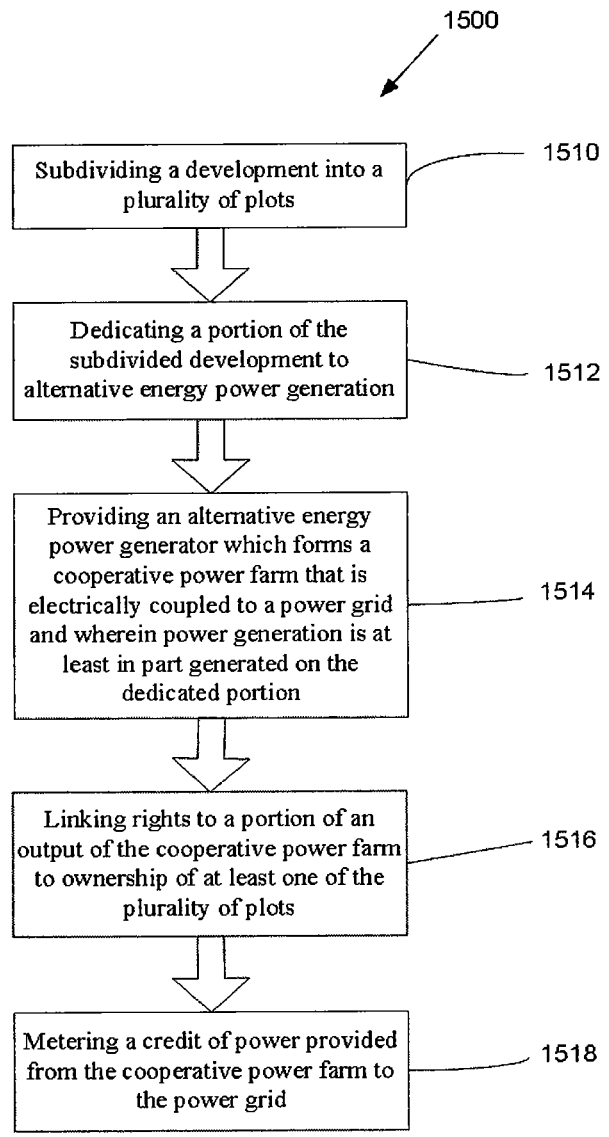
FIG. 15 is a flow diagram that illustrates an eleventh method of an embodiment of distributing alternatively generated power to a real estate development.

FIG. 15 shows an eleventh preferred embodiment of distributing alternatively generated power to a real estate development 1500 that includes subdividing 1510 the real estate development into a plurality of plots. A portion of the subdivided real estate development is dedicated 1512 to alternative energy power generation. An alternative energy power generator is provided 1514, which forms a cooperative power farm that is electrically coupled to a power grid. Power is at least in part generated on the dedicated portion. Rights to a portion of an output of the cooperative power farm are included 1516 with ownership of at least one of the plurality of plots. A credit of power provided from the cooperative power farm to the power grid is metered 1518.

Figure 16:
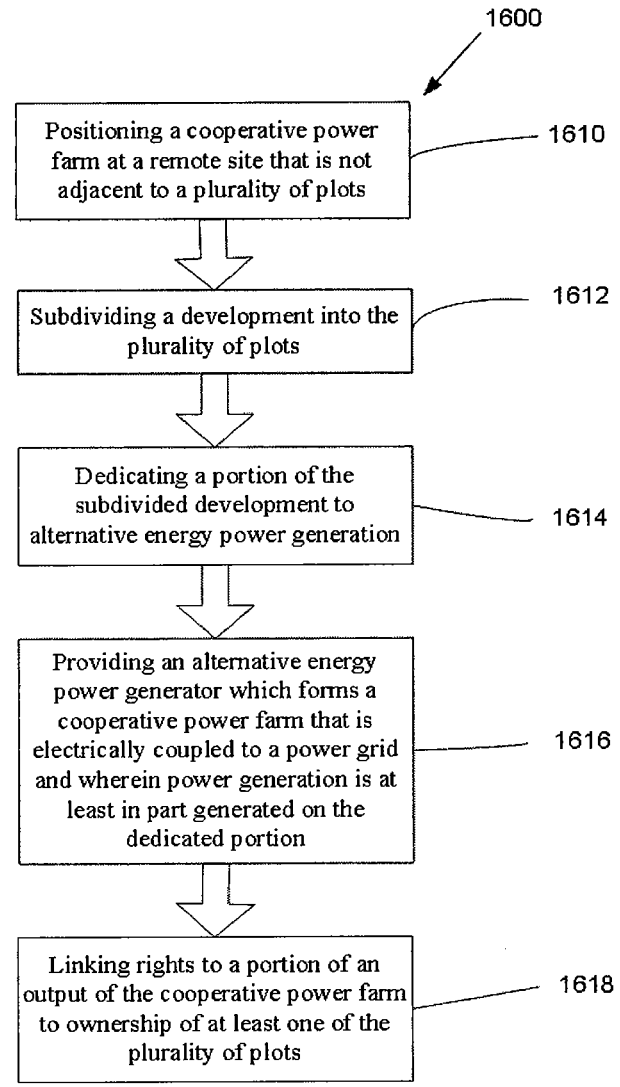
FIG. 16 is a flow diagram that illustrates a twelfth method of an embodiment of distributing alternatively generated power to a real estate development.

Referring to FIG. 16, a twelfth preferred embodiment of distributing alternatively generated power to a real estate development 1600 is depicted and includes providing 1610 a remote site and subdividing 1612 the real estate development into a plurality of plots. The remote site is not adjacent to the plurality of plots. A portion of the subdivided real estate development is dedicated 1614 to alternative energy power generation. An alternative energy power generator is provided 1616 at the remote site, which forms a cooperative power farm that is electrically coupled to a power grid. Power is at least in part generated on the dedicated portion. Rights to a portion of an output of the cooperative power farm are included 1618 with ownership of at least one of the plurality of plots.

Figure 17:
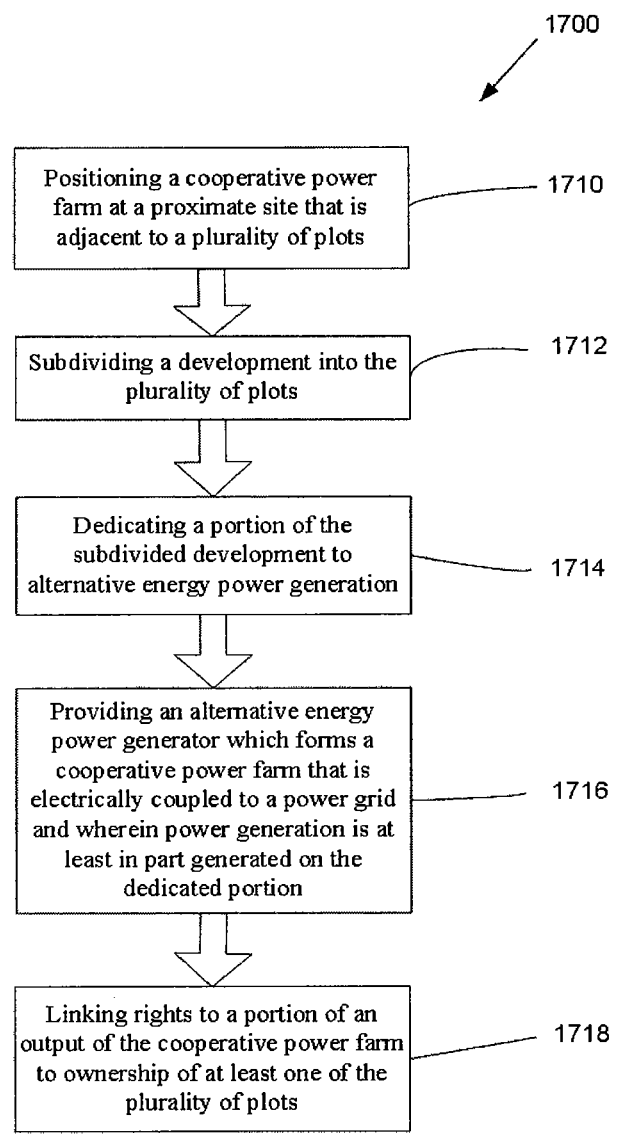
FIG. 17 is a flow diagram that illustrates a thirteenth method of an embodiment of distributing alternatively generated power to a real estate development.

FIG. 17 shows a thirteenth preferred embodiment of distributing alternatively generated power to a real estate development 1700 that includes providing 1710 a proximate site and subdividing 1712 the real estate development into a plurality of plots. The proximate site is adjacent to the plurality of plots. A portion of the subdivided real estate development is dedicated 1714 to alternative energy power generation. An alternative energy power generator is provided 1716 at the proximate site, which forms a cooperative power farm that is electrically coupled to a power grid. Power generation is at least in part generated on the dedicated portion. Rights to a portion of an output of the cooperative power farm are included 1718 with ownership of at least one of the plurality of plots.

Figure 18:
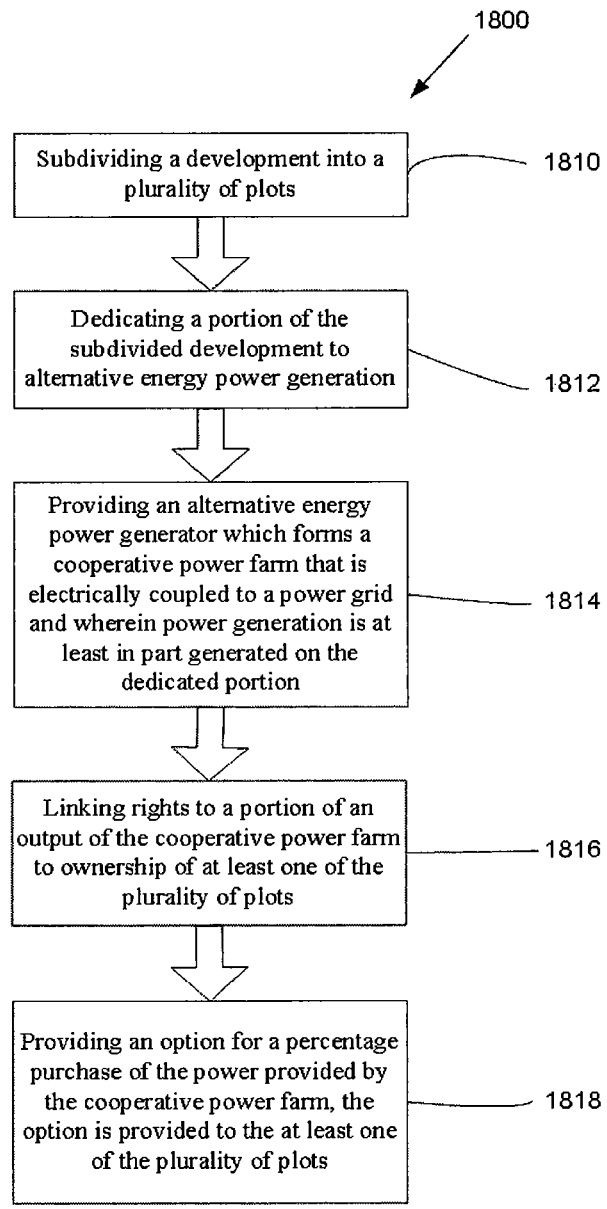
FIG. 18 is a flow diagram that illustrates a fourteenth method of an embodiment of distributing alternatively generated power to a real estate development.

FIG. 18 depicts a fourteenth preferred embodiment of distributing alternatively generated power to a real estate development 1800 that includes subdividing 1810 the real estate development into a plurality of plots, dedicating 1812 a portion of the subdivided real estate development to alternative energy power generation, and providing 1814 an alternative energy power generator that forms a cooperative power farm electrically coupled to a power grid. Power is at least in part generated on the dedicated portion. Rights to a portion of an output of the cooperative power farm are included 1816 with ownership of at least one of the plurality of plots. An option is provided 1818 to the at least one of the plurality of plots for a percentage purchase of the power provided by the cooperative power farm.

Figure 19:
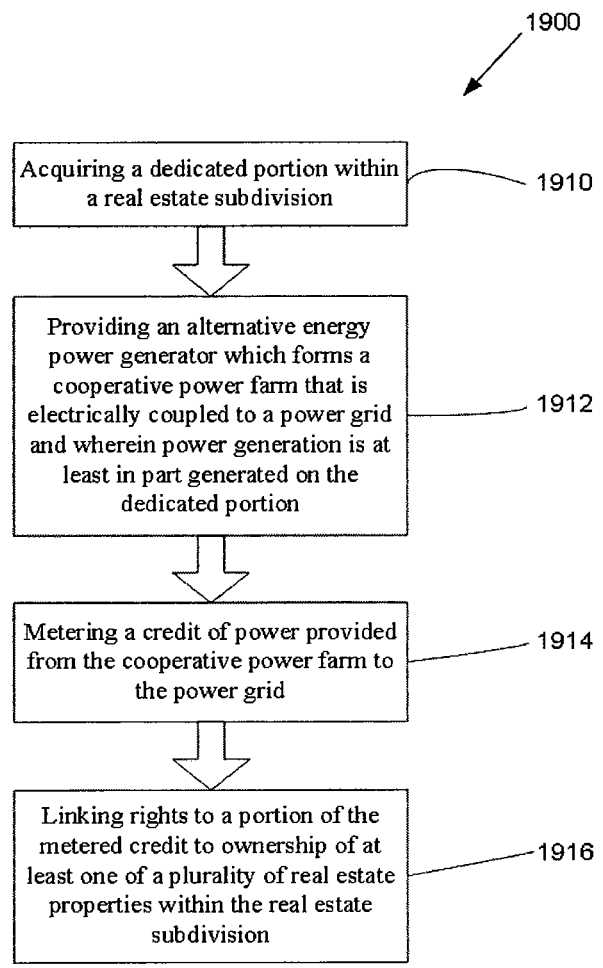
FIG. 19 is a flow diagram that illustrates a fifteenth method of an embodiment of distributing alternatively generated power to a real estate development.

Referring to FIG. 19, a fifteenth preferred embodiment of distributing alternatively generated power to a real estate development 1900 is depicted and includes acquiring 1910 a dedicated portion within the real estate development and providing 1912 an alternative energy power generator that forms a cooperative power farm electrically coupled to a power grid. Power is at least in part generated on the dedicated portion. A credit of power provided from the cooperative power farm to the power grid is metered 1914. Rights to a portion of the metered credit are included 1916 with ownership of at least one of a plurality of real estate properties within the real estate development.

Figure 20:
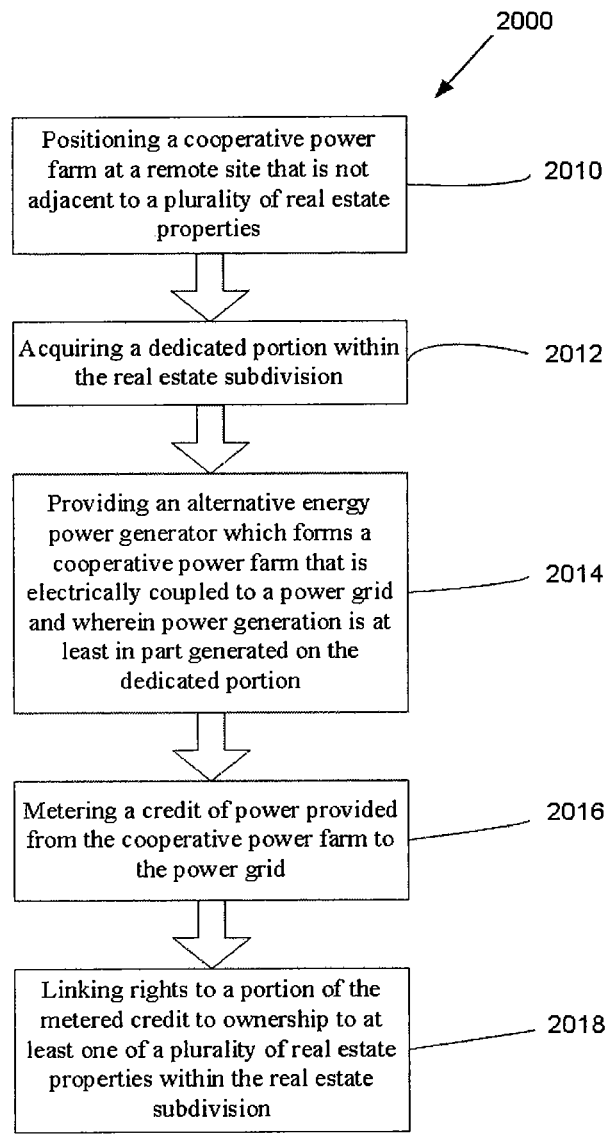
FIG. 20 is a flow diagram that illustrates a sixteenth method of an embodiment of distributing alternatively generated power to a real estate development.

FIG. 20 shows a sixteenth preferred embodiment of distributing alternatively generated power to a real estate development 2000 having a plurality of real estate properties. The method includes providing 2010 a remote site that is not adjacent to the plurality of real estate properties, and acquiring 2012 a dedicated portion within the real estate development. An alternative energy power generator is provided 2014 at the remote site, which forms a cooperative power farm that is electrically coupled to a power grid. Power is at least in part generated on the dedicated portion. A credit of power provided from the cooperative power farm to the power grid is metered 2016. Rights to a portion of the metered credit are included 2018 with ownership of at least one of a plurality of real estate properties within the real estate development.

Figure 21:
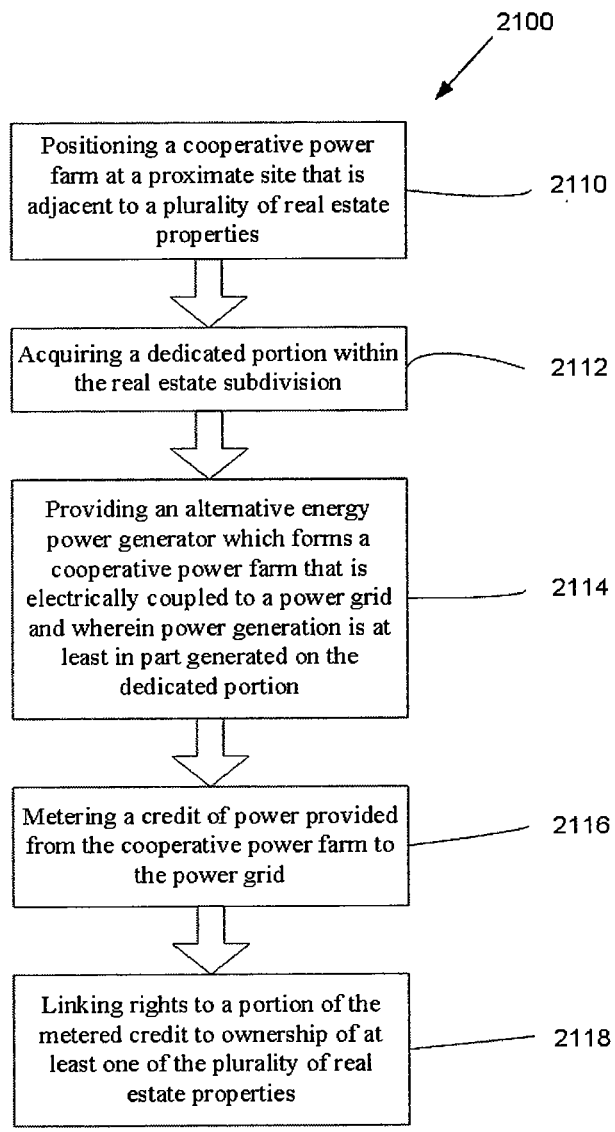
FIG. 21 is a flow diagram that illustrates a seventeenth method of an embodiment of distributing alternatively generated power to a real estate development.

FIG. 21 depicts a seventeenth preferred embodiment of distributing alternatively generated power to a real estate development 2100 having a plurality of real estate properties. The method includes providing 2110 a proximate site adjacent to the plurality of real estate properties and acquiring 2112 a dedicated portion within the real estate development. An alternative energy power generator is provided 2114 at the proximate site, which forms a cooperative power farm that is electrically coupled to a power grid. Power is at least in part generated on the dedicated portion. A credit of power provided from the cooperative power farm to the power grid is metered 2116. Rights to a portion of the metered credit are included 2118 with ownership of at least one of a plurality of real estate properties within the real estate development.

Figure 22:
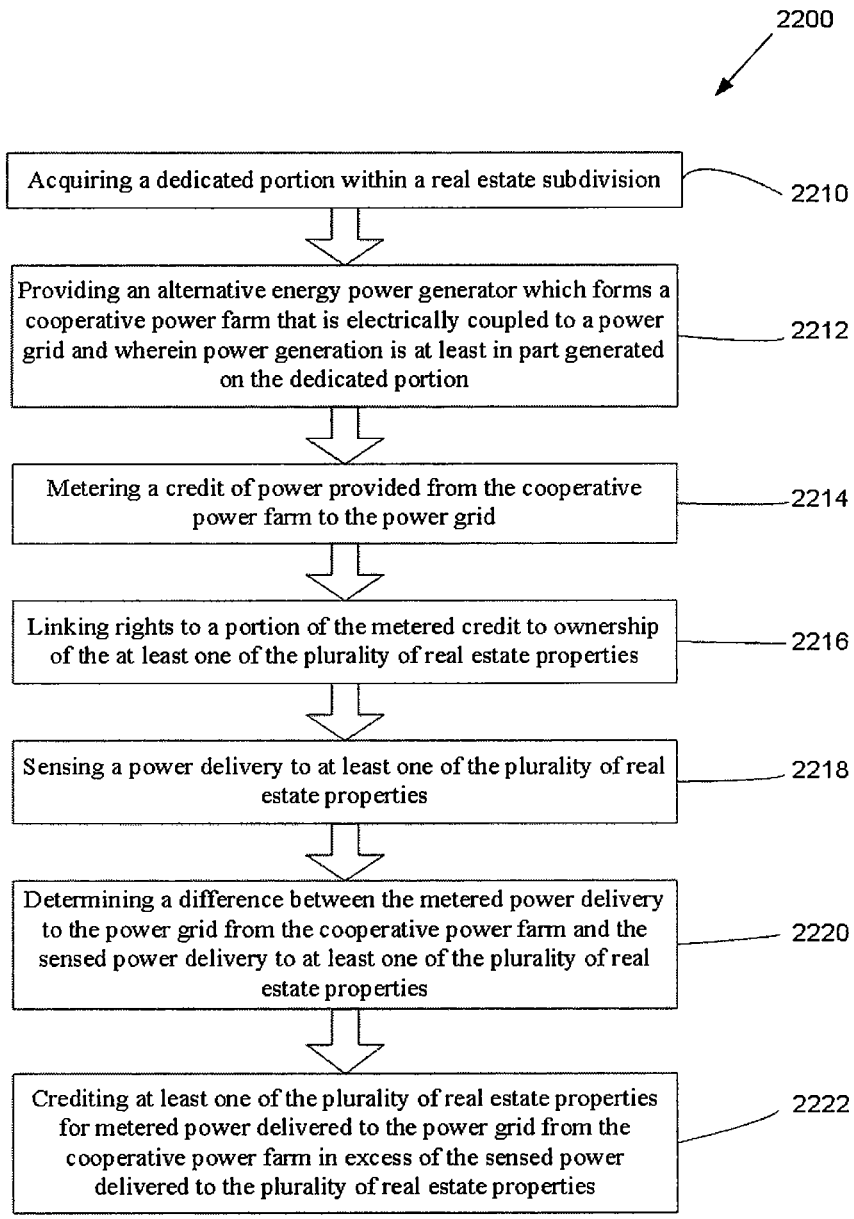
FIG. 22 is a flow diagram that illustrates an eighteenth method of an embodiment of distributing alternatively generated power to a real estate development.

Referring to FIG. 22, an eighteenth preferred embodiment of distributing alternatively generated power to a real estate development 2200 is depicted and includes acquiring 2210 a dedicated portion within the real estate development, and providing 2212 an alternative energy power generator, which forms a cooperative power farm that is electrically coupled to a power grid. Power is at least in part generated on the dedicated portion. A credit of power provided from the cooperative power farm to the power grid is metered 2214. Rights to a portion of the metered credit are included 2216 with ownership of at least one of a plurality of real estate properties within the real estate development. A power delivery to the at least one of the plurality of real estate properties is sensed 2218 and a difference between the metered power delivery to the power grid from the cooperative power farm and the sensed power delivery to the at least one of the plurality of real estate properties is determined 2220. At least one of the plurality of real estate properties is credited 2222 for metered power delivered to the power grid from the cooperative power farm in excess of the sensed power delivered to the at least one of the plurality of real estate properties.

Figure 23:
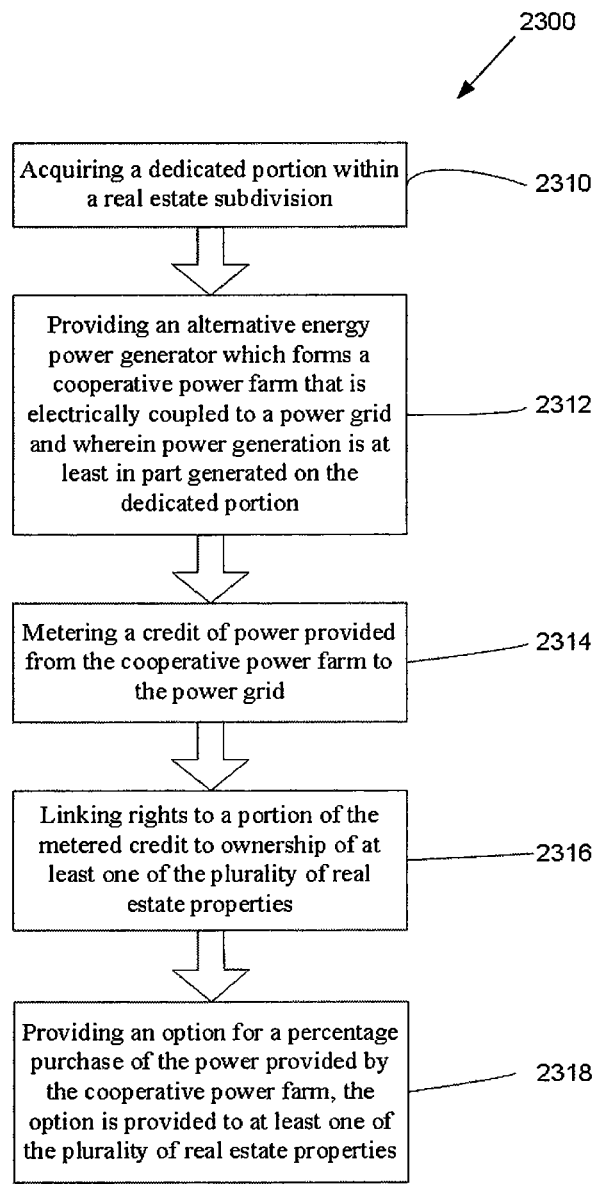
FIG. 23 is a flow diagram that illustrates a nineteenth method of an embodiment of distributing alternatively generated power to a real estate development.

FIG. 23 shows a nineteenth preferred embodiment of distributing alternatively generated power to a real estate development 2300 that includes acquiring 2310 a dedicated portion within the real estate development and providing 2312 an alternative energy power generator that forms a cooperative power farm electrically coupled to a power grid. Power is at least in part generated on the dedicated portion. A credit of power provided from the cooperative power farm to the power grid is metered 2314. Rights to a portion of the metered credit are included 2316 with ownership of at least one of a plurality of real estate properties within the real estate development. An option is provided 2318 to the at least one of the plurality of real estate properties for a percentage purchase of the power provided by the cooperative power farm.

Figure 24:
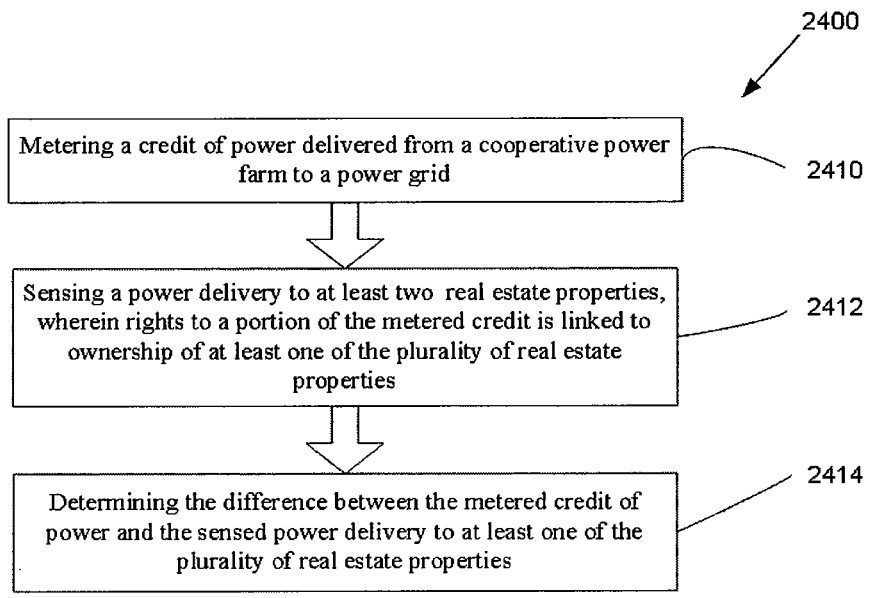
FIG. 24 is a flow diagram that illustrates a first software of an embodiment of distributing alternatively generated power to a real estate development.

FIG. 24 depicts a first software flow block diagram 2400 for a computer readable media of distributing alternatively generated power to a real estate development that includes instructions for metering 2410 a credit of power delivered from a cooperative power farm to a power grid and sensing 2412 a power delivery to at least two real estate properties. Rights to a portion of the metered credit are included with ownership of at least one of the plurality of real estate properties. Further instructions are provided for determining 2414 the difference between the metered credit of power and the sensed power delivery to at least one of the plurality of real estate properties.

Figure 25:
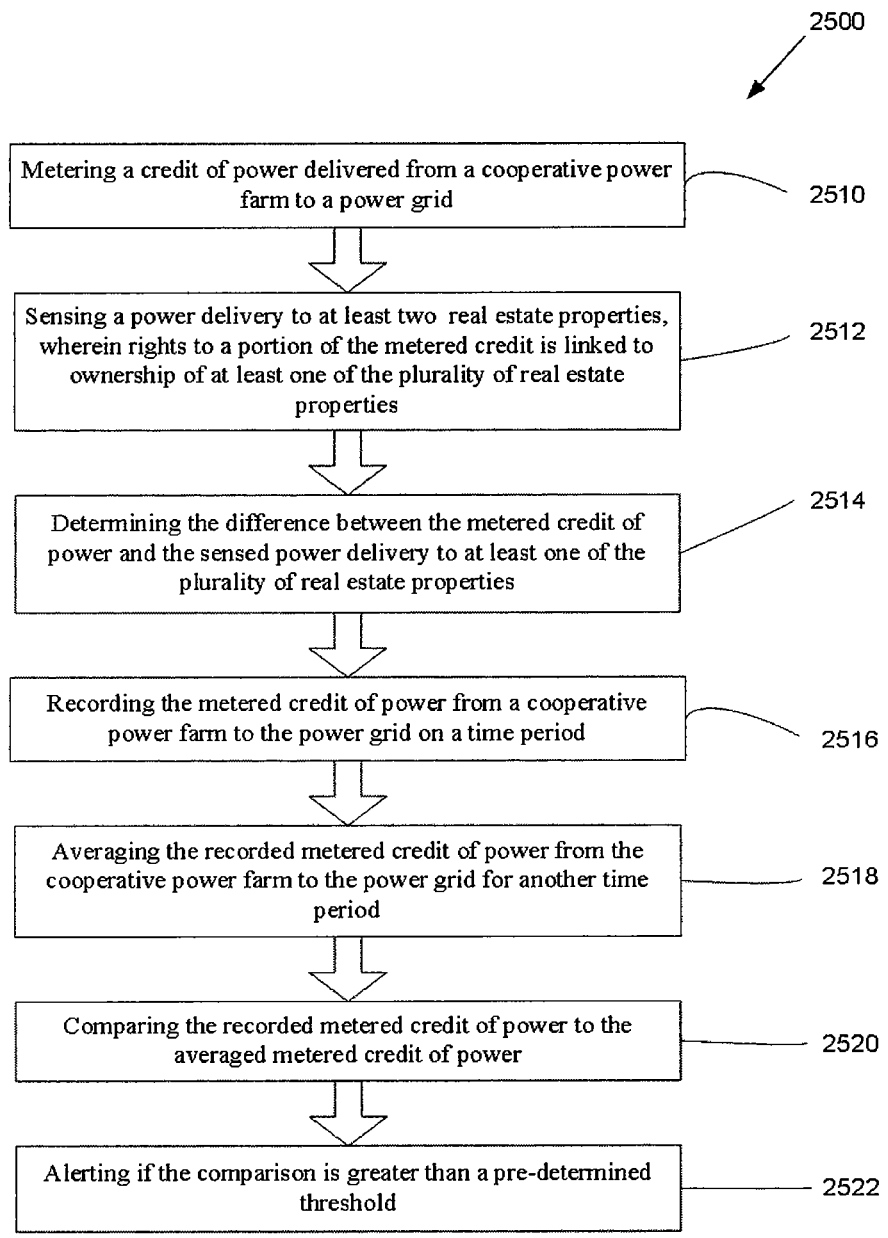
FIG. 25 is a flow diagram that illustrates a second software of an embodiment of distributing alternatively generated power to a real estate development.

Referring to FIG. 25, a second software flow block diagram 2500 for a computer readable media of distributing alternatively generated power to a real estate development is depicted and includes instructions for metering 2510 a credit of power delivered from a cooperative power farm to a power grid and sensing 2512 a power delivery to at least two real estate properties. Rights to a portion of the metered credit are included with ownership of at least one of the plurality of real estate properties. Further instructions are provided for determining 2514 the difference between the metered credit of power and the sensed power delivery to at least one of the plurality of real estate properties. The computer readable media also includes instructions for recording 2516 the metered credit of power from a cooperative power farm to the power grid on a time period, averaging 2518 the recorded metered credit of power from the cooperative power farm to the power grid for another time period, comparing 2520 the recorded metered credit of power to the averaged metered credit of power, and alerting 2522 if the comparison is greater than a pre-determined threshold.

Figure 26:
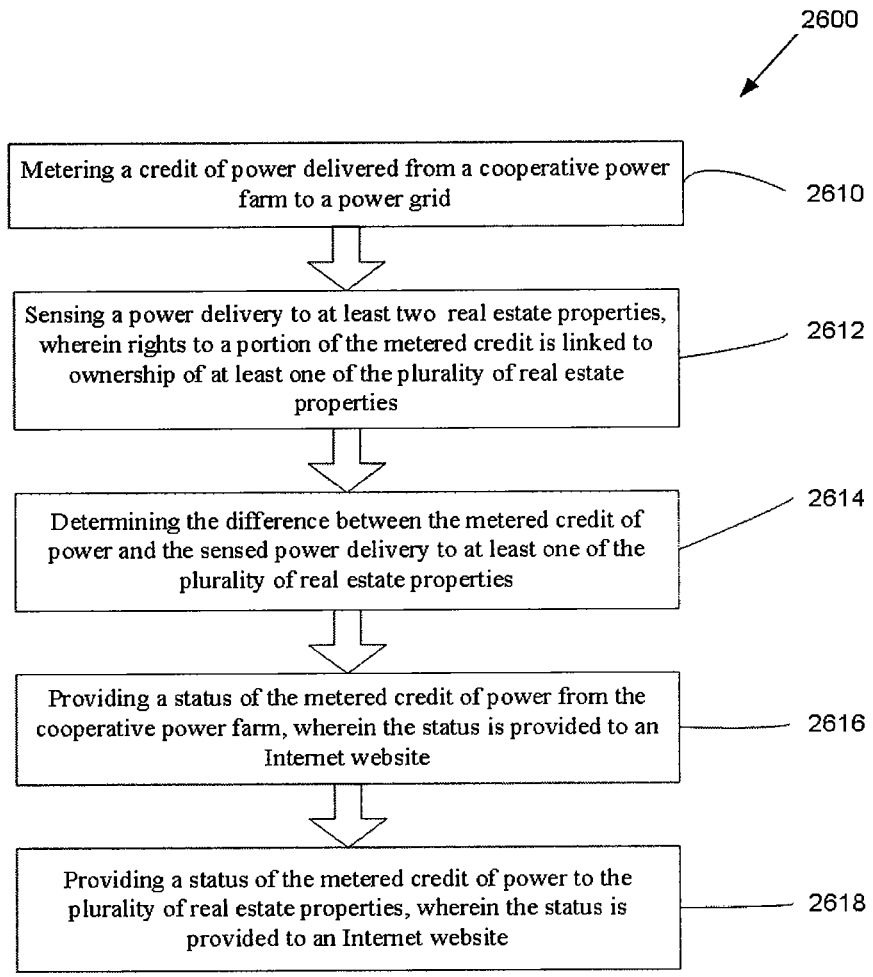
FIG. 26 is a flow diagram that illustrates a third software of an embodiment of distributing alternatively generated power to a real estate development.

FIG. 26 shows a third software flow block diagram 2600 for a computer readable media of distributing alternatively generated power to a real estate development that includes instructions for metering 2610 a credit of power delivered from a cooperative power farm to a power grid and sensing 2612 a power delivery to at least two real estate properties. Rights to a portion of the metered credit are included with ownership of at least one of the plurality of real estate properties. Further instructions are provided for determining 2614 the difference between the metered credit of power and the sensed power delivery to at least one of the plurality of real estate properties. The computer readable media also includes instructions for providing 2616, to an Internet website, a status of the metered credit of power from the cooperative power farm and providing 2618, to an Internet website, a status of the metered credit of power to at least one of the plurality of real estate properties.

Figure 27:
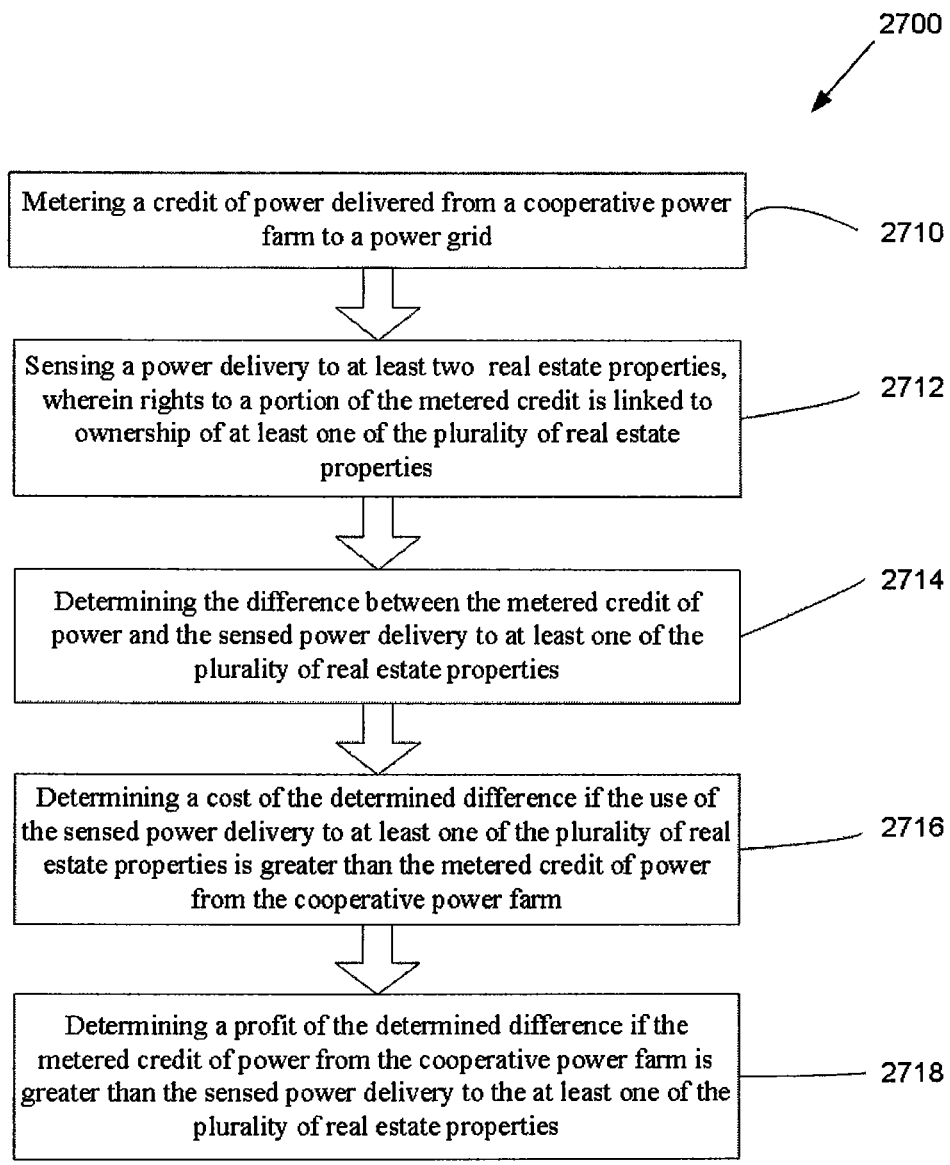
FIG. 27 is a flow diagram that illustrates a fourth software of an embodiment of distributing alternatively generated power to a real estate development.

FIG. 27 depicts a fourth software flow block diagram 2700 for a computer readable media of distributing alternatively generated power to a real estate development that includes instructions for metering 2710 a credit of power delivered from a cooperative power farm to a power grid and sensing 2712 a power delivery to at least two real estate properties. Rights to a portion of the metered credit are included with ownership of at least one of the plurality of real estate properties. Further instructions are provided for determining 2714 the difference between the metered credit of power and the sensed power delivery to at least one of the plurality of real estate properties. The computer readable media also includes instructions for determining 2716 a cost of the determined difference if the use of the sensed power delivery to at least one of the plurality of real estate properties is greater than the metered credit of power from the cooperative power farm and determining 2718 a profit of the determined difference if the metered credit of power from the cooperative power farm is greater than the sensed power delivery to the at least one of the plurality of real estate properties.

The steps described in the embodiments above are preferably embodied in a computer readable medium or software but may also be embodied in firmware and are utilized via hardware. The transfer of information occurs via at least one of a wireless protocol, a wired protocol, and the combination of the wireless and wired protocols. The steps performed in FIGS. 24-27 are performed by software, hardware, firmware, and/or the combination of software, hardware, and/or firmware.

Although exemplary embodiments of the present invention have been illustrated in the accompanying drawings and described in the foregoing detailed description, it will be understood that the invention is not limited to any embodiment disclosed, but is capable of numerous rearrangements, modifications, and substitutions without departing from the spirit of the invention as set forth and defined by the following claims. For example, these capabilities may be performed in the current manner or in a distributed manner and on, or via, any device able to provide and/or receive information. Further, although various embodiments have been described in relation to electrical energy sources the systems can be used with other types of energy, such as natural gas, without departing from the scope of the appended claims. Further, although depicted in a particular manner, various modules or blocks may be repositioned without departing from the scope of the current invention. Still further, although depicted in a particular manner, a greater or lesser number of modules and connections can be utilized in order to accomplish the described system, to provide additional known features to the present embodiments, and/or to make the described system more efficient. Also, the information sent between various modules can be sent between the modules via at least one of a data network, the Internet, an Internet Protocol network, a wireless source, and a wired source, and via plurality of protocols.

From the foregoing, it can be seen that embodiments of the present invention comprise a system and method for distributing alternatively generated power to a real estate development. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A system for distributing alternatively generated power to a real estate development, the system comprising:
    at least one alternative energy electrical power generator forming a cooperative power farm, the at least one alternative energy electrical power generator configured to supply electrical power to a power grid;
    a metering credit system configured to determine a metered credit of power supplied to the power grid from the cooperative power farm; and
    a plurality of real estate properties electrically coupled to the power grid, the plurality of real estate properties receiving at least a portion of the metered credit of power, a first owner owning a first real estate property of the plurality of real estate properties, the first owner's ownership of the first property tied to a first right to the portion of the metered credit such that transfer of ownership of the first real estate property from the first owner to a second owner transfers the first right to the portion of the metered credit to a second owner.

2. The system of claim 1, further comprising:
a severe weather input coupled to the at least one electrical power generator, the severe weather input being configured to place the generator in a stand-by state to reduce possible damage from severe weather.

3. The system of claim 2, further comprising:
a solar panel having a resilient backing, the resilient backing being turned toward the severe weather during the severe weather.

4. The system of claim 1, wherein the electrical power generator comprises at least one solar-powered generator.

5. The system of claim 1, wherein the electrical power generator comprises at least one wind-powered generator.

6. The system of claim 1, wherein the electrical power generator comprises at least one geothermal-powered generator.

7. The system of claim 1, wherein the electrical power generator comprises at least one hydroelectric generator.

8. The system of claim 1 further comprising:
a power management system monitoring the electrical power provided to at least one of the plurality of real estate properties.

9. The system of claim 1, wherein a portion of the electrical power is provided to at least one of the plurality of real estate properties from a source other than the cooperative power farm.

10. The system of claim 1 further comprising:
a power usage alert for updating a resident of the plurality of real estate properties if a power usage spike is detected.

11. A system for distributing alternatively generated power to a real estate development, the system comprising:
at least one alternative energy power generator forming a cooperative power farm;
a distribution station receiving power from the cooperative power farm;
a metering credit system configured to determine a metered credit of power received by the distribution station from the cooperative power farm; and
a plurality of real estate properties, including a first real estate property, coupled to the distribution station, each of the real estate properties receiving at least a portion of the metered credit of power with the first real estate property receiving a first portion of the metered credit of power, ownership of at least one of the plurality of real estate properties including rights to the portion of the metered credit, the first portion being tied to and transferable with the first real estate property.

12. The system of claim 11, wherein the power received from the cooperative power farm is in the form of a hydrocarbon gas.

13. The system of claim 12, wherein the gas is one of methane and natural gas.

14. The system of claim 11, wherein the power received from the cooperative power farm is in the form of one of a hydrogen bearing gas and electricity.

15. The system of claim 11, wherein the portion of the metered credit provides a quantity of power at least partially determined by a percentage of the power generated by the cooperative power farm.

16. The system of claim 11, wherein the portion of the metered credit provides a quantity of power at least partially determined by a number of units of metered credit.

17. The system of claim 11, wherein the portion of the metered credit provides a quantity of power at least partially determined by an area of the real estate property.

18. The system of claim 11, wherein the portion of the metered credit provides a quantity of power at least partially determined by a corresponding initial payment.

19. The system of claim 11, wherein the rights to the portion of the metered credit are optional.

20. A method for distributing alternatively generated power to a real estate development, the method comprising:
generating, by at least one alternative energy electrical power generator forming a cooperative power farm, alternative energy electrical power;
receiving electrical power from the cooperative power farm by a power grid;
metering, by a credit metering system, a credit of power received by the power grid from the cooperative power farm; and
distributing, by the power grid, the credit of power to at least one of a plurality of real estate properties electrically coupled to the power grid, the plurality of real estate properties receiving at least a portion of the credit of power, wherein a first real estate property of the plurality of real estate properties receives a first portion of the at least a portion of the credit of power, ownership of the at least one of the plurality of real estate properties including rights to the portion of the metered credit, such that the first portion is tied to and transferable with the first real estate property.

21. The method of claim 20, further comprising:
positioning the cooperative power farm at a remote site that is not adjacent to the plurality of real estate properties.

22. The method of claim 20, further comprising:
positioning the cooperative power farm at a proximate site that is adjacent to the plurality of real estate properties.

23. The method of claim 20, further comprising:
updating an Internet feedback system showing available credit for at least one of the plurality of real estate properties.

24. The method of claim 20, further comprising:
updating an Internet status system showing power generation efficiency.

* * * * *